United States Patent [19]
Itoh et al.

[11] Patent Number: 5,481,465
[45] Date of Patent: Jan. 2, 1996

[54] METHOD OF AND SYSTEM FOR PRODUCING SOLID MODELS

[75] Inventors: Kazuo Itoh; Kazuhiko Narita; Shuichi Kitazawa; Masanori Tokoi; Ayumi Nakajima; Hiroshi Sekine, all of Sayama, Japan

[73] Assignee: Honda Giken Kogyo Kabushiki Kaisha, Japan

[21] Appl. No.: 161,598

[22] Filed: Dec. 6, 1993

[30] Foreign Application Priority Data

Dec. 9, 1992 [JP] Japan ................................. 4-329593
Dec. 9, 1992 [JP] Japan ................................. 4-329624
Aug. 2, 1993 [JP] Japan ................................. 5-191402

[51] Int. Cl.⁶ ............................................ G06F 15/60
[52] U.S. Cl. ........................................................ 364/468
[58] Field of Search ........................... 364/474.24, 512, 364/468, 474.29, 578; 395/120–123, 129, 119, 161, 141; 340/723, 729

[56] References Cited

U.S. PATENT DOCUMENTS

| | | |
|---|---|---|
| 4,646,251 | 2/1987 | Hayes et al. . |
| 4,791,583 | 12/1988 | Colburn ................................. 395/120 |
| 4,937,768 | 6/1990 | Carver ................................. 364/474.24 |
| 5,119,309 | 5/1992 | Cavendish et al. ................. 364/474.24 |
| 5,189,626 | 2/1993 | Colburn . |

FOREIGN PATENT DOCUMENTS 3252872  11/1991  Japan .

*Primary Examiner*—Roy N. Envall, Jr.
*Assistant Examiner*—Choung D. Ngo

[57] ABSTRACT

A method of and an apparatus for producing solid models, in which input data consisting of the coordinates of terminal points and a formula of a curved line of each arc of a given wire frame model is read. The coordinates of a node and a set of arcs connected thereto are determined based on the input coordinates of the terminal points. A set of arcs looping around an indivisible surface of the wire frame model are specified as the outermost line surrounding the whole wire frame model. A region of the wire frame model surrounded by the outermost line or division lines is divided into two new partial wire frame models by a new division line starting from a node located on the outermost line or the division lines, traversing the region without making a loop, passing along each of the arcs included in the region only once, and reaching another node located on the outermost line or the division lines. The division is repeated until there remains no arc which has not yet been passed through in any of the partial wire frame models. A a set of arcs looping around each of the further-indivisible partial wire frame models is defined as surface loop.

10 Claims, 29 Drawing Sheets

FIG.9

| NAME OF ARC | START POINT | END POINT |
|---|---|---|
| L1 | P1 | P5 |
| L2 | P2 | P6 |
| L3 | P3 | P7 |
| L4 | P7 | P8 |
| L5 | P8 | P9 |
| L6 | P9 | P10 |
| L7 | P10 | P12 |
| L8 | P12 | P13 |
| L9 | P13 | P14 |
| L10 | P14 | P4 |
| ⋮ | ⋮ | ⋮ |
| $L_n$ | $P_n$ | $P_{n-1}$ |

FIG.10

| NAME OF NODE | NAME OF CONNECTED ARCS | | | |
|---|---|---|---|---|
| P1 | L1 | L17 | | |
| P2 | L2 | L15 | L17 | |
| P3 | L3 | L14 | L15 | |
| P4 | L10 | L14 | L20 | |
| P5 | L1 | L16 | L18 | |
| P6 | L2 | L13 | L18 | |
| P7 | L3 | L4 | L13 | |
| P8 | L4 | L5 | L11 | L19 |
| ⋮ | ⋮ | ⋮ | ⋮ | ⋮ |
| $P_n$ | $L_n$ | $L_{n-1}$ | $L_{n-2}$ | $L_{n-3}$ |

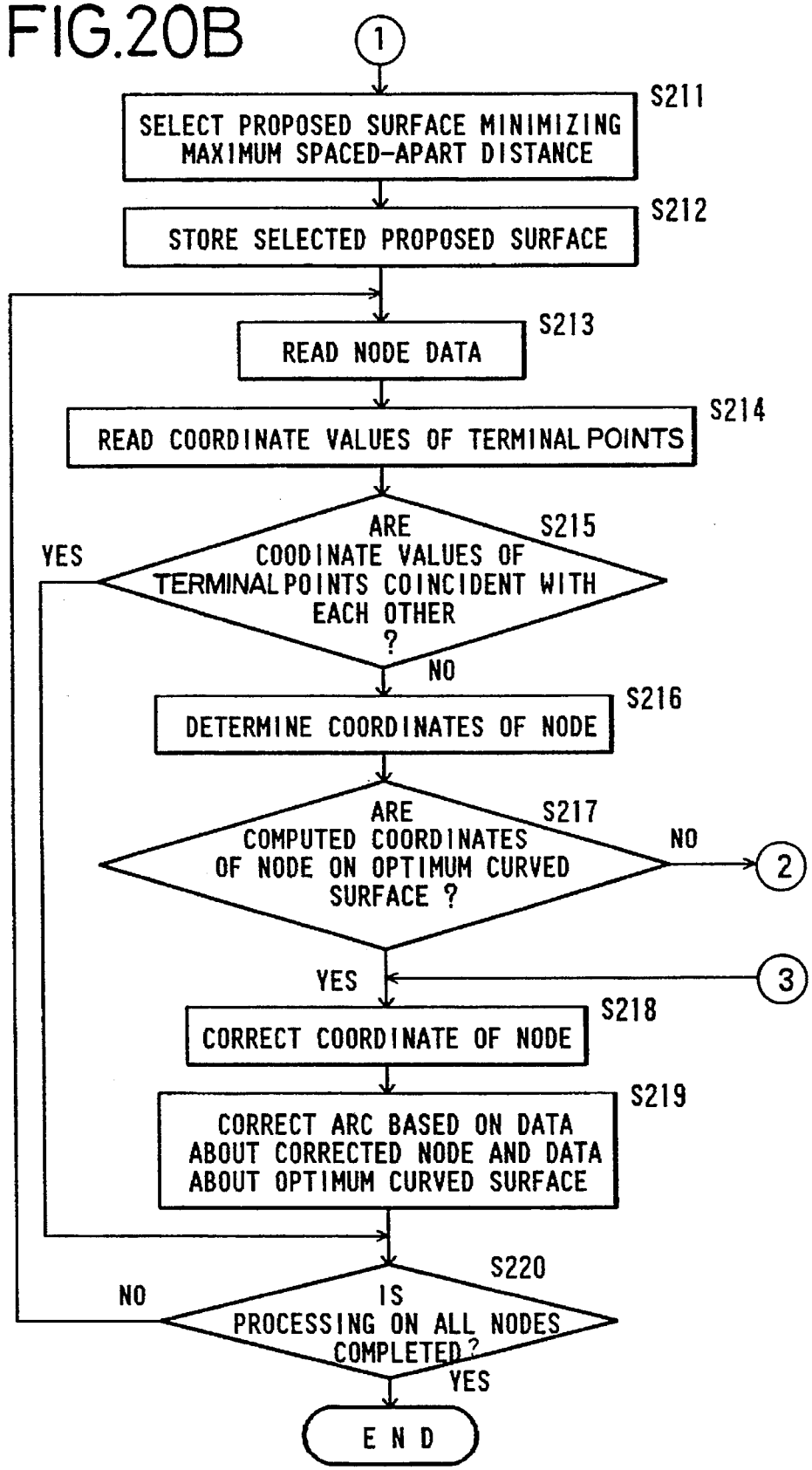

FIG.23

| |
|---|
| ARC DATA STORAGE SECTION |
| ARCS 1 THROUGH $N_1$ |
| NODE DATA STORAGE SECTION |
| NODES 1 THROUGH $N_2$ |
| SURFACE LOOP DATA STORAGE SECTION |
| SURFACE LOOPS 1 THROUGH $N_3$ |
| CURVED-SURFACE SHAPE DATA STORAGE SECTION |
| CURVED-SURFACE SHAPES 1 THROUGH $N_4$ |

FIG.24

| ARC NUMBER 1 | ARC NUMBER N₁ |
|---|---|
| CURVILINEAR EQUATION | CURVILINEAR EQUATION |
| SURFACE LOOPS ATTACHED 1, 2 | SURFACE LOOPS ATTACHED ⋯ |
| START NODE DATA COORDINATE VALUE OF NODE 1 | START NODE DATA COORDINATE VALUE OF NODE |
| END NODE DATA COORDINATE VALUE OF NODE 2 | END NODE DATA COORDINATE VALUE OF NODE |
| PROPOSED SURFACES 1, 2, 7, 11, 16 | PROPOSED SURFACES ⋯ |

FIG.25

| NODE 1 | NODE 2 | | NODE N₂ |
|---|---|---|---|
| ARCS 1, 2, 5, 8 | ARCS 1, 4, 6, 12 | | ARCS ... |
| SURFACE LOOPS 1, 2, 4, 5 | SURFACE LOOPS 1, 2, 6, 7 | | SURFACE LOOPS ... |
| COORDINATE VALUE OF NODE | COORDINATE VALUE OF NODE | | COORDINATE VALUE OF NODE |

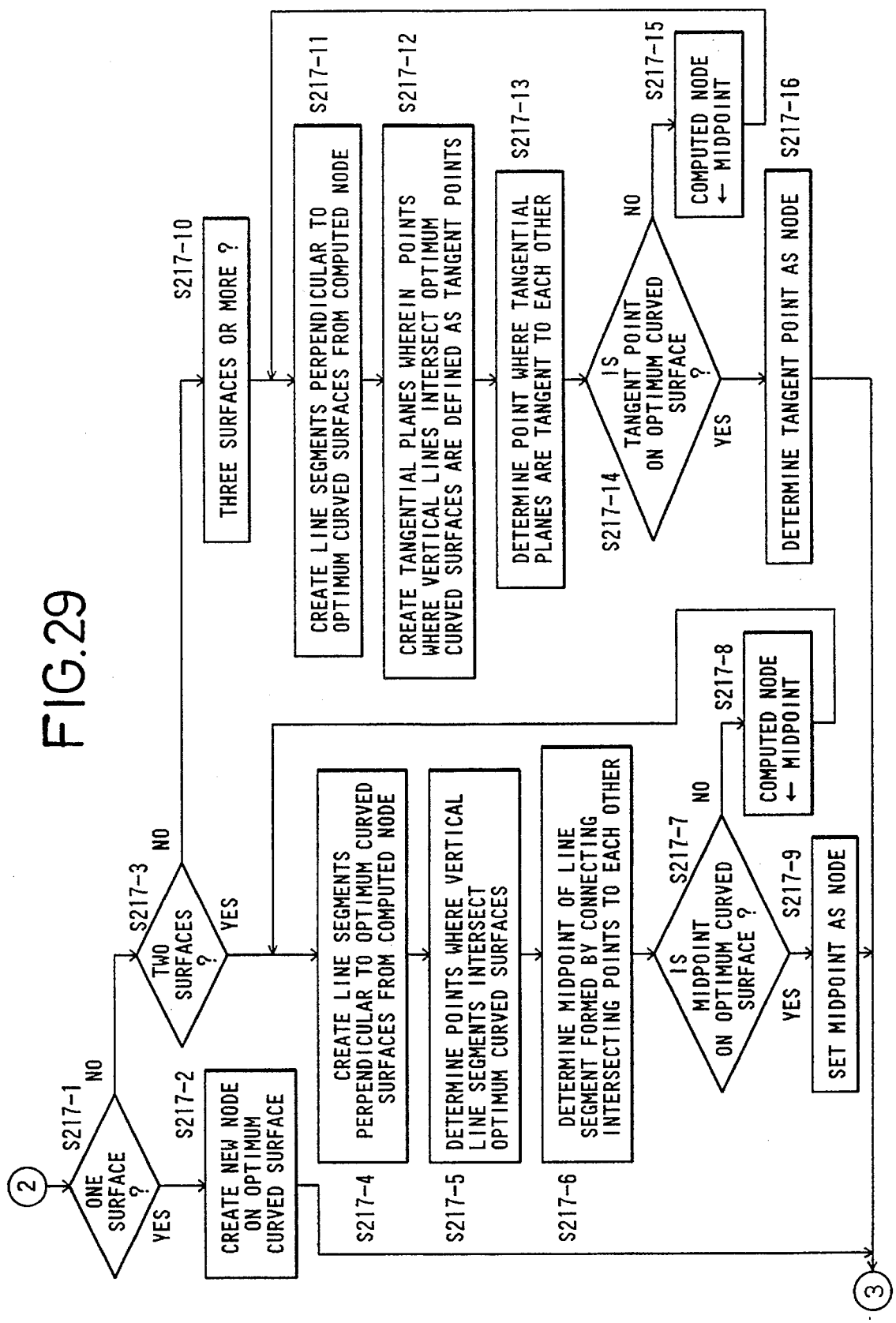

METHOD OF AND SYSTEM FOR PRODUCING SOLID MODELS

BACKGROUND OF THE INVENTION

1. Field of the Invention

This invention relates to a method of and a system for producing a solid model, wherein an incomplete wire frame model representative of an external shape of an object is corrected to make a complete wire frame model, based on which closed loops composed of respective arcs or feature-lines of the external shape of the object are determined, and respective closed loops and curved surfaces prepared in advance are matched.

2. Description of the Related Art

In designing a vehicle body, conventionally, a mock-up model representative of the vehicle body is first produced. Then, a wire frame model is produced by extracting feature-lines existing on the external surface of the mock-up model as arcs, and dividing the external surface into a set of curved surfaces, ie three-dimensionally curved surfaces, along the arcs. The arcs looping around each curved surface form a closed loop (called a "surface loop"). A solid model, ie a three-dimensional model (called also a "surface model") is built by connecting such curved surfaces, based on data (called "NC data") input to a numerically controlled machine tool for fabricating a press mold is produced.

In the situation described above, since the mock-up model has often been produced putting a greater importance on design than others, there may be a case where the mock-up model is not accurate in terms of details. Thus, there may be included defective arcs whose end points do not meet at any of nodes in a wire frame model created by a CAD system based on such an inaccurate mock-up model. In such a situation, the NC data cannot be obtained immediately from an incomplete wire frame model.

Thus, in the customary practice, when an operator inspected CAD data about a wire frame model and found an imperfection such as an arc having no endpoint at which it intersects with another arc, such an imperfection had to be corrected to obtain a complete wire frame model during a conference of the CAD operator and a producer of the mock-up model.

The customary method mentioned above, however, has been time consuming, especially when the wire frame model includes many surface loops representing a complex external shape of a vehicle body. Further, there have been problems that the time required for the model correction and the accuracy of the resulting model are different depending on the degree of experience of the operator in charge.

SUMMARY OF THE INVENTION

The present invention has been made to solve the above problems. Therefore, an object of the present invention is to provide a method of and a system for rapidly correcting a wire frame model which may include imperfections originated by an imperfect mock-up model, without the need of operator's experience, determining respective surface loops based on so-obtained wire frame model, and matching the respective surface loops with corresponding solid surface data given in advance.

In order to achieve the above object, the present invention provides a method of and an apparatus for producing solid models, in which input data consisting of the coordinates of terminal points and a formula of a curved line of each arc of a given wire frame model is read; the coordinates of a node and a set of arcs connected thereto are determined based on the input coordinates of the terminal points; a set of arcs looping around an indivisible surface of the wire frame model are specified as forming the outermost line surrounding the whole wire frame model except for said indivisible surface; a region of the wire frame model surrounded by the outermost line or division lines is divided into two new partial wire frame models by a new division line starting from a node located on the outermost line or the division lines, traversing the region without making a loop, passing along each of the arc or arcs included in the region only once, and reaching another node located on the outermost line or the division lines; the division is repeated until there remains no arc which has not yet been passed through in any of the partial wire frame models, and a set of arcs looping around each of the further-indivisible partial wire frame models is defined as a surface loop of said wire frame model.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 9 is a view for describing terminal point data extracted in accordance with the flowchart shown in FIG. 7;

FIG. 10 is a view for describing node data determined in accordance with the flowchart shown in FIG. 7;

FIGS. 20A and 20B are respectively flowcharts for describing a method of producing surface models from a wire frame model by the solid model producing system according to the present invention;

FIG. 23 is a view for describing wire frame data stored in a memory circuit employed in the solid model producing system shown in FIG. 21;

FIG. 24 is a view for describing arc data stored in a arc data storage section in the memory circuit shown in FIG. 23;

FIG. 25 is a view for explaining node data stored in a node data storage section in the memory circuit shown in FIG. 23;

FIG. 29 is a flowchart for explaining a method of correcting nodes when computed nodes do not exist on the corresponding curved surfaces.

DETAILED DESCRIPTION OF THE PREFERRED EMBODIMENTS

A method of creating or producing solid models, according to the present invention will hereinafter be described in detail with reference to the accompanying drawings in which preferred embodiments are shown by way of illustrative example, in connection with a system for effecting the method.

FIRST EMBODIMENT

Figure 1:
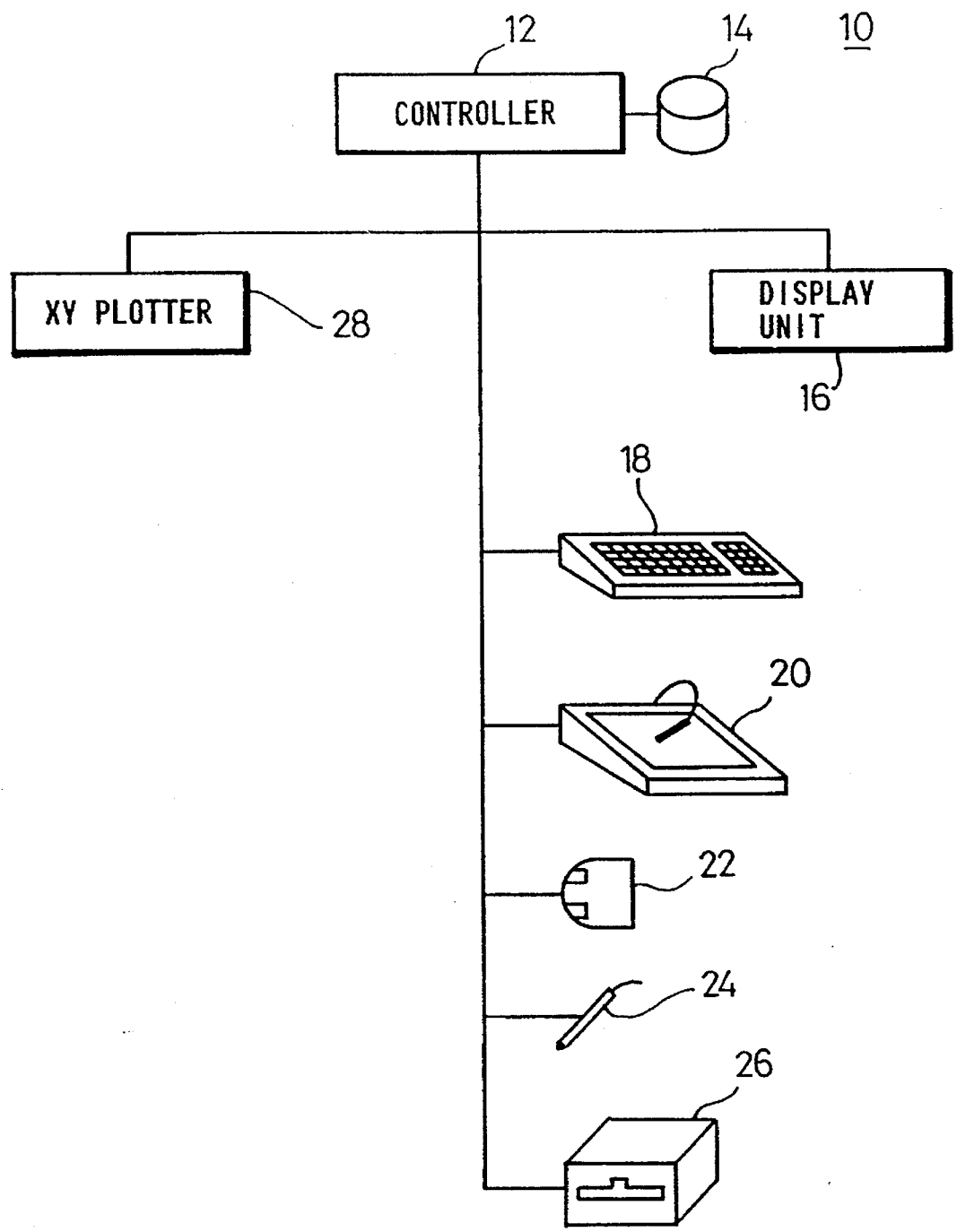
FIG. 1 is a block diagram showing the structure of a solid model producing system according to a first embodiment of the present invention.

FIG. 1 is a block diagram showing the structure of a solid model producing system 10 according to a first embodiment of the present invention. The solid model producing system 10 comprises a controller 12 which has a central processing unit and performs a graphic calculation, a graphic display, data base management, etc., a mass storage unit 14 capable of preserving a large amount of graphic information and updating the same, a graphic-corresponding type display unit 16 serving as a centrally-operated device, which is used to display interactive talk between the solid model producing system 10 and an operator, a keyboard 18 used as an input device, a tablet 20, a mouse 22, a lightpen 24, a floppy disk driver (hereinafter called an "FDD") 26 and an XY plotter 28 used as a graphic output unit.

Figure 2:
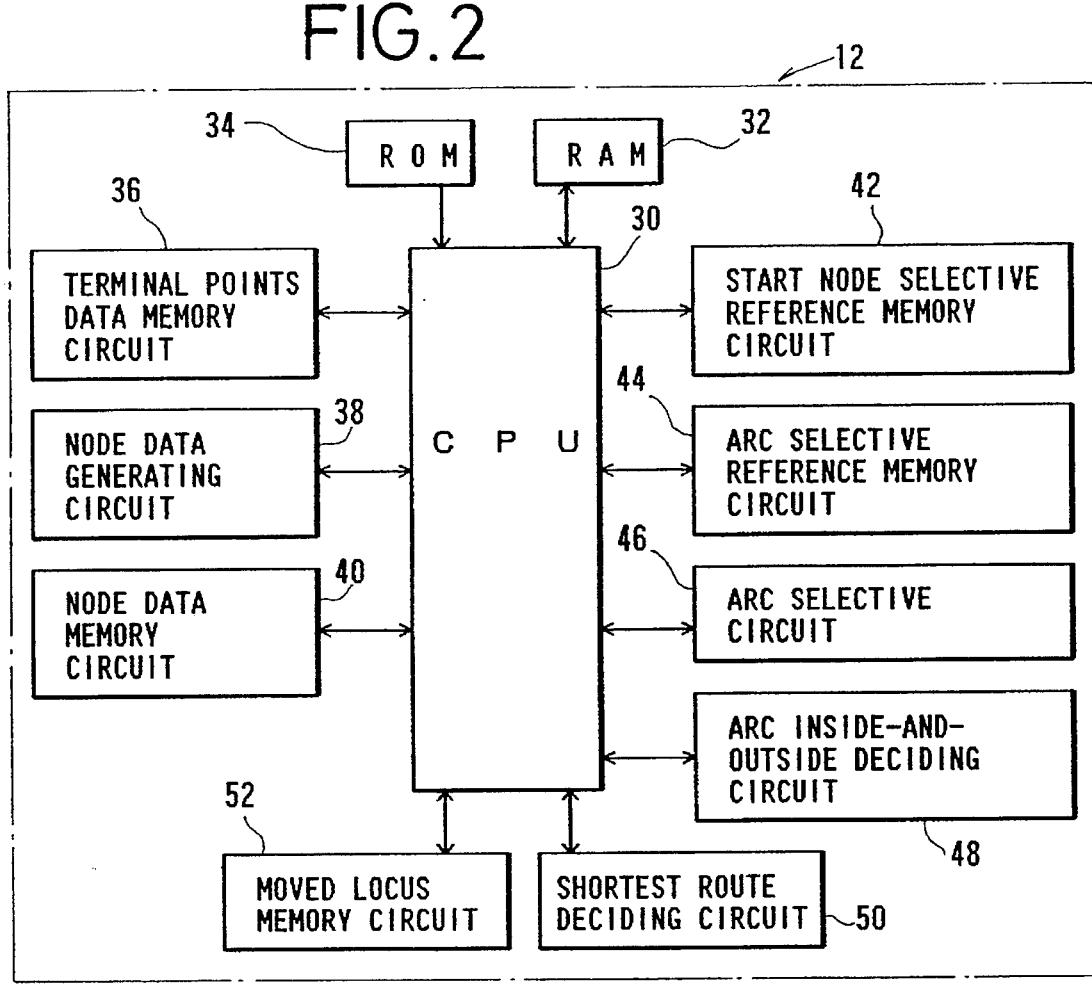
FIG. 2 is a block diagram illustrating the structure of a controller employed in the solid model producing system shown in FIG. 1.

FIG. 2 is a block diagram illustrating the structure of the controller 12.

The controller 12 comprises the central processing unit (hereinafter called a "CPU") 30, a read/write memory (hereinafter called a "RAM") 32 for temporarily storing the result of computation by the CPU 30 therein and storing therein data about a rough wire frame model, which has been read by the FDD 26, a read-only memory (hereinafter called a "ROM") 34 for storing pre-written programs therein, a start-and-end points data memory circuit 36 for storing three-dimensional coordinate data about start and end points (hereinafter called "start-and-end points") of arcs which form a wire frame model, a node data generating circuit 38 for generating data about points (hereinafter called "nodes") at each of which a plurality of start-and-end points are set or gathered, from the start-and-end point data, and a node data memory circuit 40 for storing therein the node data generated by the node data generating circuit 38.

Further, the controller 12 comprises a start link-point selective reference memory circuit 42 for storing therein as data standards or references for selecting a start node of a moving point S which traces each arc of a wire frame model, an arc selective reference memory circuit 44 for storing therein as data standards or references for selecting a arc that the moving point S traces at each node, an arc selecting circuit 46 for selecting an arc based on the arc selective references, an arc inside-and-outside deciding circuit 48 for deciding whether or not loci of arcs that a moving point S has traced, fall within a desired wire frame model, a shortest route deciding circuit 50 for deciding the shortest route from the loci decided by the arc inside-and-outside deciding circuit 48, and a moved locus memory circuit 52 for storing the shortest route decided by the shortest route deciding circuit 50 therein as data.

Figure 3:
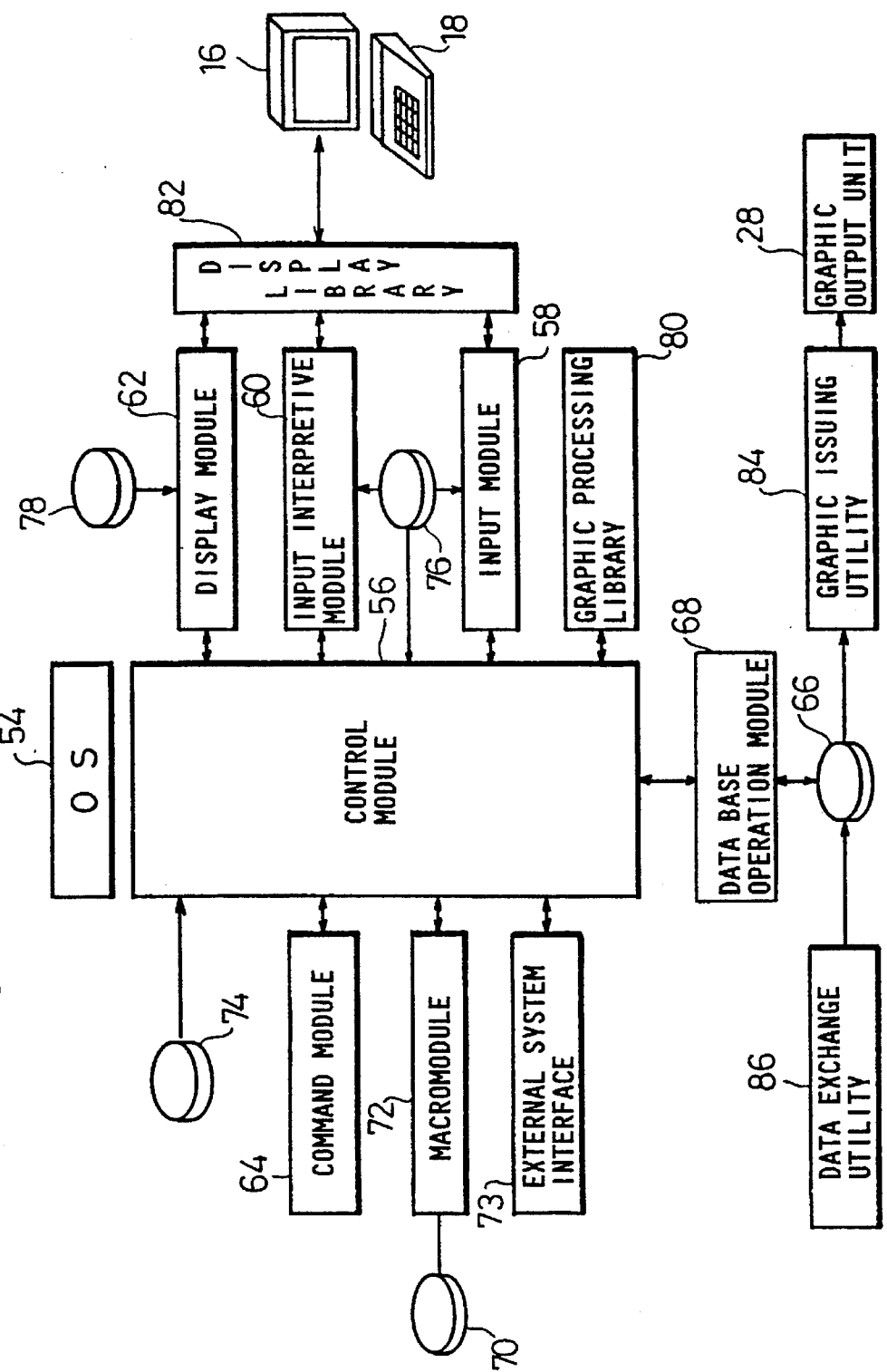
FIG. 3 is a view for describing modules of programs stored in the controller shown in FIG. 2.
Figure 4:
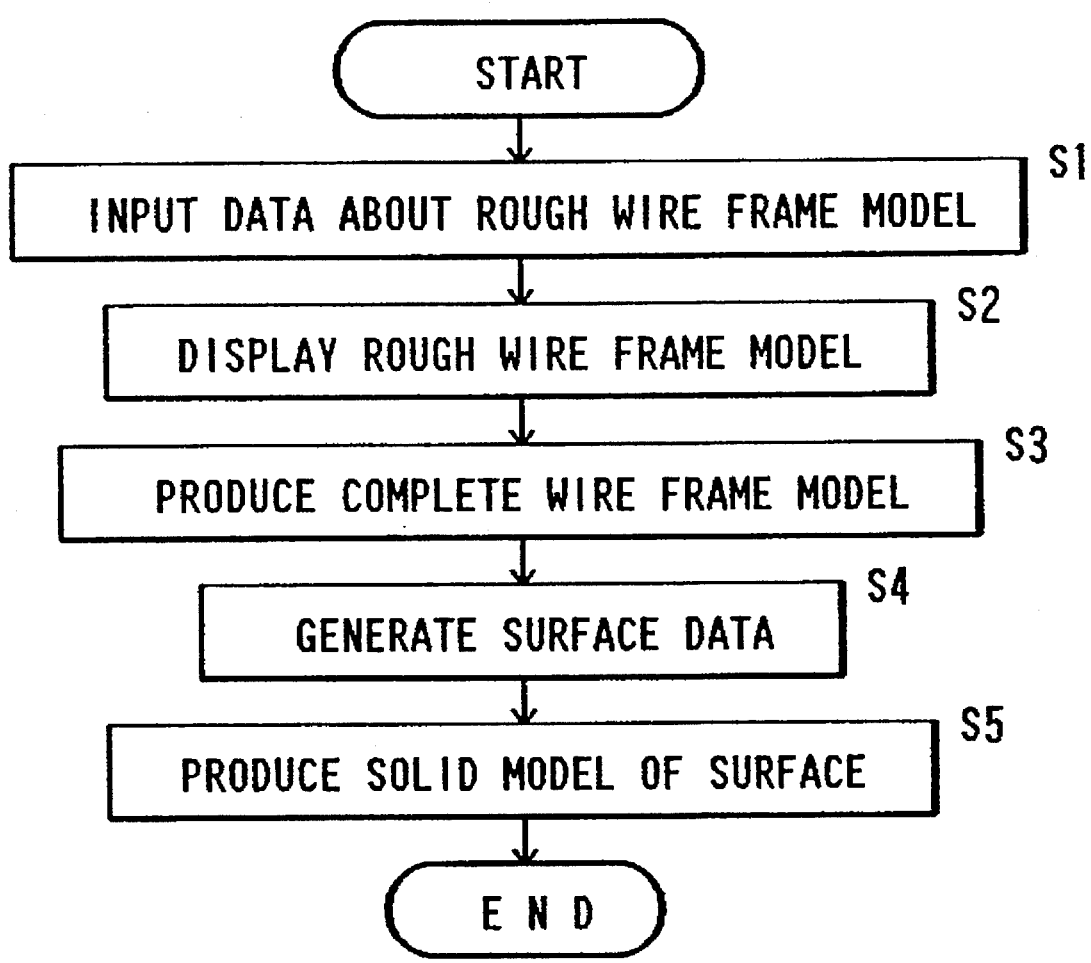
FIG. 4 is a flowchart for describing a method of creating solid models of respective surfaces from a wire frame model by the solid model producing system shown in FIG. 1.

FIG. 3 shows programs stored in the mass storage unit 14 and the ROM 34 both employed in the solid model producing system 10.

The programs can be classified into the following modules according to functions to be borne:

(a) An operating system 54 and a control module 56 each used to control respective processes to be executed by the controller 12 and the flow of information therein.

(b) An input module 58 used to aid in such a manner that an input operation corresponding to each of various types of input devices, for example, the keyboard 18 is smoothly performed.

(c) An input interpretive module 60 used to read or interpret input information in accordance with the form of a command.

(d) A display module 62 used to manage or control displayed information and effect a display process in accordance with a command.

(e) A command module 64 used to carry out a graphic process in accordance with commands comprising submodules corresponding to instructions.

(f) A data base operation module 68 used to efficiently retrieve and store a large amount of information held in a data base 66 and necessary for the solid model producing system 10.

(g) A macromodule 72 used to execute a macroprogram 70 corresponding to an automatic design program.

(h) An external system interface 73 used to exchange information with the other system and execute respective processes in interlock with the same.

Moreover, the controller 12 is provided with auxiliary files such as a system control file 74 for storing therein information about the structure of the system and reference or standard values or the like, a command control file 76 for storing therein information about the operational property of each command and a program control procedure, a display control file 78 for storing therein information about the type and structure of a display unit, etc. in order to maintain the extendibility and maintainability. Incidentally, the controller 12 also includes, as other auxiliary files, programs such as a graphic processing library 80 for performing graphic processing, a display library 82 for displaying information on the display unit 16, a graphic issuing utility 84 for issuing the result of graphic processing to the XY plotter 28, a data exchange utility 86 used to be connected to the other CAD system, etc. Each of the modules will next be described in brief. The control module 56 sets a program group in the form of modules and intervenes between adjacent respective modules so as to unitarily supervise or manage the intra-system control and standardize an access procedure. The control module 56 performs, as its functions, start, completion and malfunction processes and various processes such as control for execution of each module, recording of an execution history, a debug function, a specific process of the operating system 54, etc.

The input module 58 provides an operator with a suitable input procedure based on a specification produced by arranging and unifying various inputting methods of various input devices. The input module 58 has a function for promoting an input operation for instructing an operator to designate or specify the type of information to be inputted, a method of inputting information and an input device, a function for selecting a desired input device and a function for changing input information from the present mode to a normal or standard mode.

The input interpretive module 60 unifies a method of interpreting input information and a display of the result of its interpretation to thereby support diverse input designating or instructing methods, improve the operability of inputting information and maintain the extendibility of the system. The input interpretive module 60 also has a function for interpreting the input information and displaying the result of its interpretation.

The display module 62 unitarily processes a demand for diverse display operations and controls both displayed information and displayed states of the information. The display module 62 has a function for performing the control or supervision of each display, the supervision of its display control and its displayed information and the supervision of its displayed states.

The command module 64 unitarily controls or supervises the form of an input argument, an access to a processing program based on a command and a method of processing the result of its access, thereby maintaining the maintainability and extendibility of the system.

The data base operation module 68 standardizes a data requiring method issued from the other module and provides a recovering function upon occurrence of faults. The data base operation module 68 has a function for performing the control or supervision of the working state of the data base 66, the operation of the data base 66, a process to be executed upon occurrence of the faults, etc.

The external system interface 73 standardizes the transmission and reception of information to and from the other system and takes full advantage of the solid model producing system 10. The external system interface 73 has a function for performing the transmission and reception of the information to and from an external system and control for the execution of external programs.

The macromodule 72 performs the control for the execution of operations or instructions of the solid model producing system 10 in accordance with the created macroprogram 70. The macromodule 72 has a function for translating the macroprogram 70 and executing the same.

A description will now be made of an operation for creating solid models of surfaces from a rough wire frame model produced based on a mock-up model by the solid model producing system 10 having the programs referred to above with reference to FIGS. 1 through 6.

CAD data about the rough wire frame model created in accordance with the mock-up model is first inputted from the FDD 26 and then read by the controller 12 (Steps S1). Thereafter, the read CAD data is subjected to data conversion by the display module 62 and the display library 82 and then displayed on the display unit 16 (Step S2).

Figure 5:
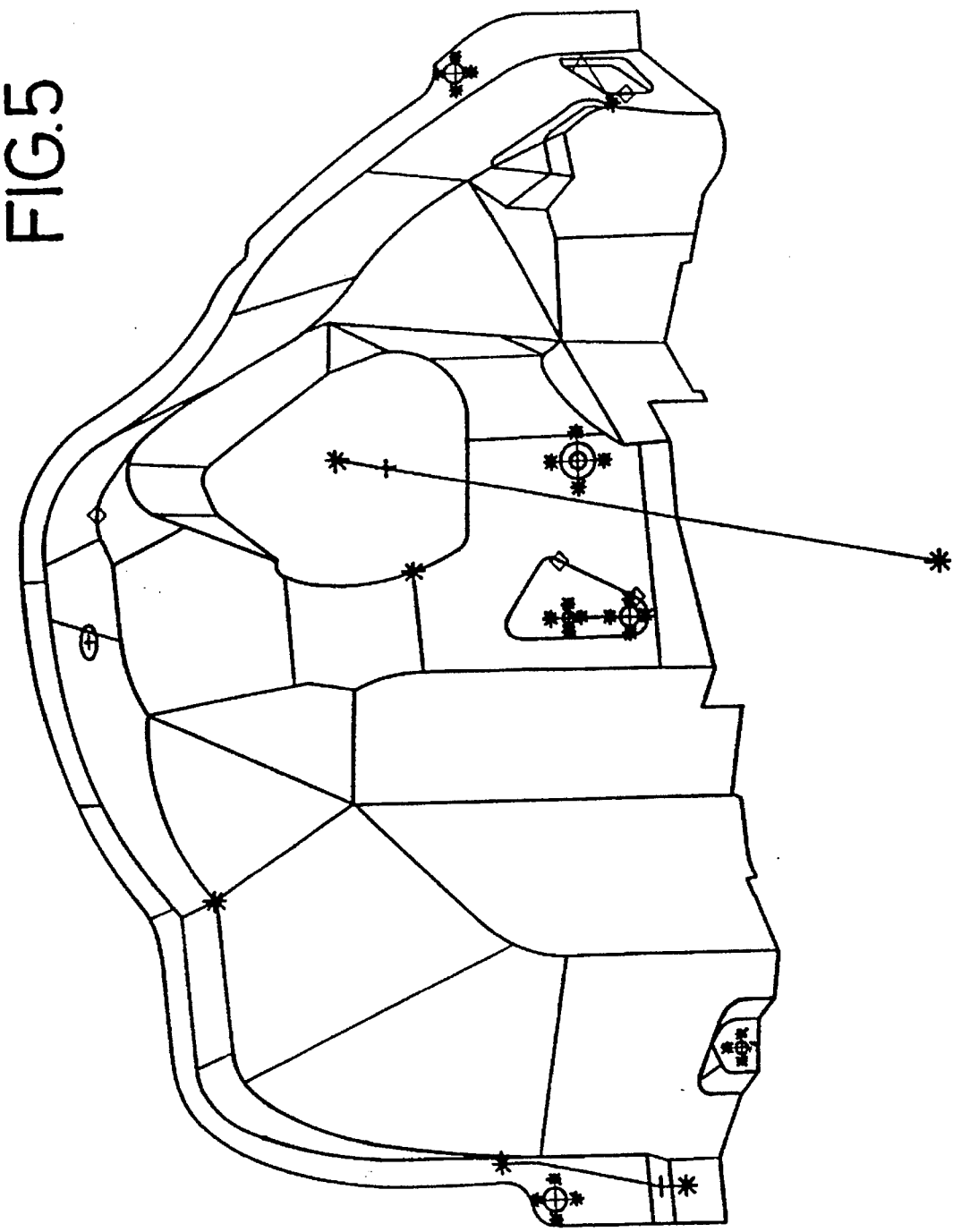
FIG. 5 is a view for explaining a rough wire frame model displayed on a display unit employed in the solid model producing system shown in FIG. 1.
Figure 6:
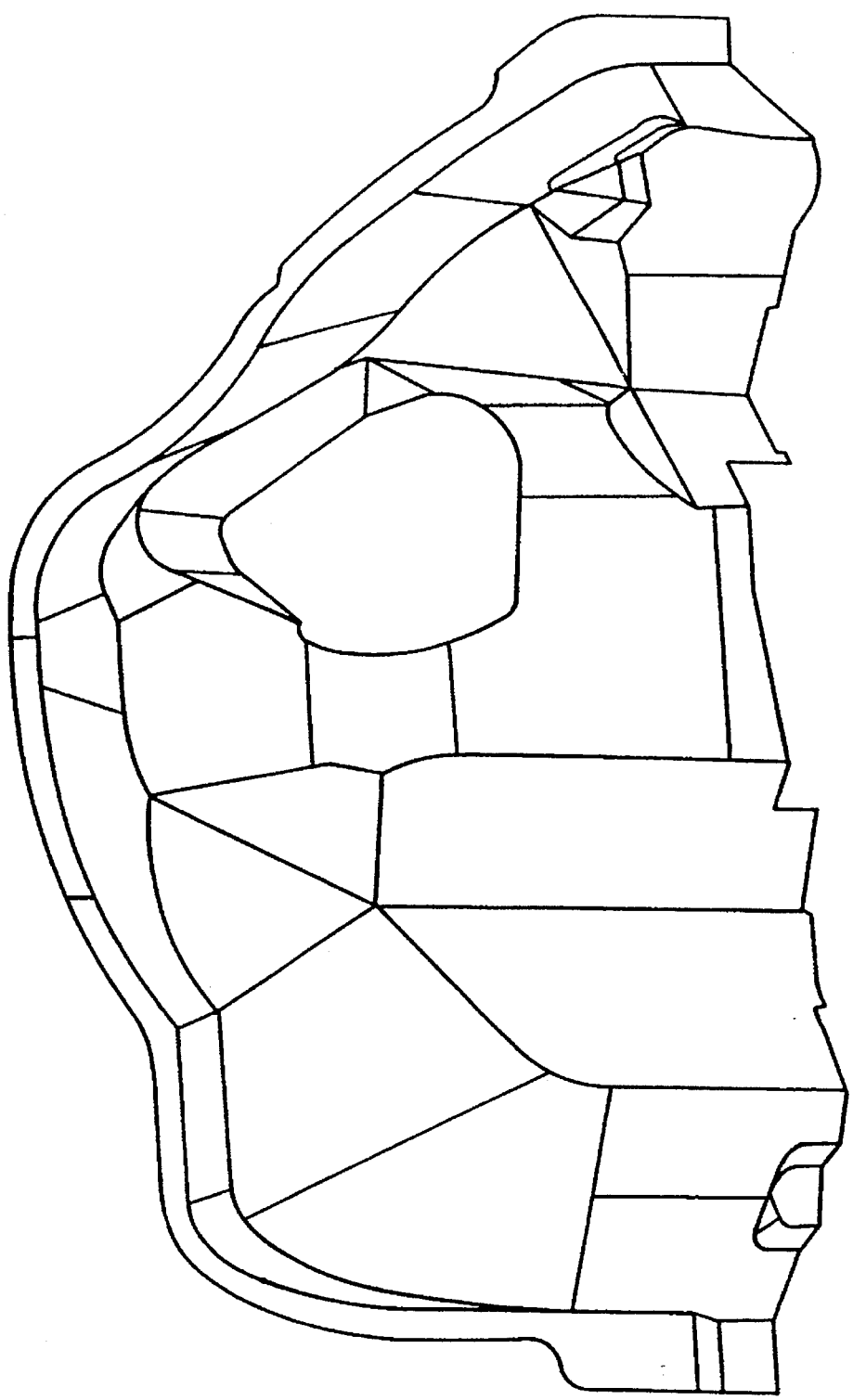
FIG. 6 is a view for describing a wire frame model corrected by the solid model producing system shown in FIG. 1.
Figure 7:
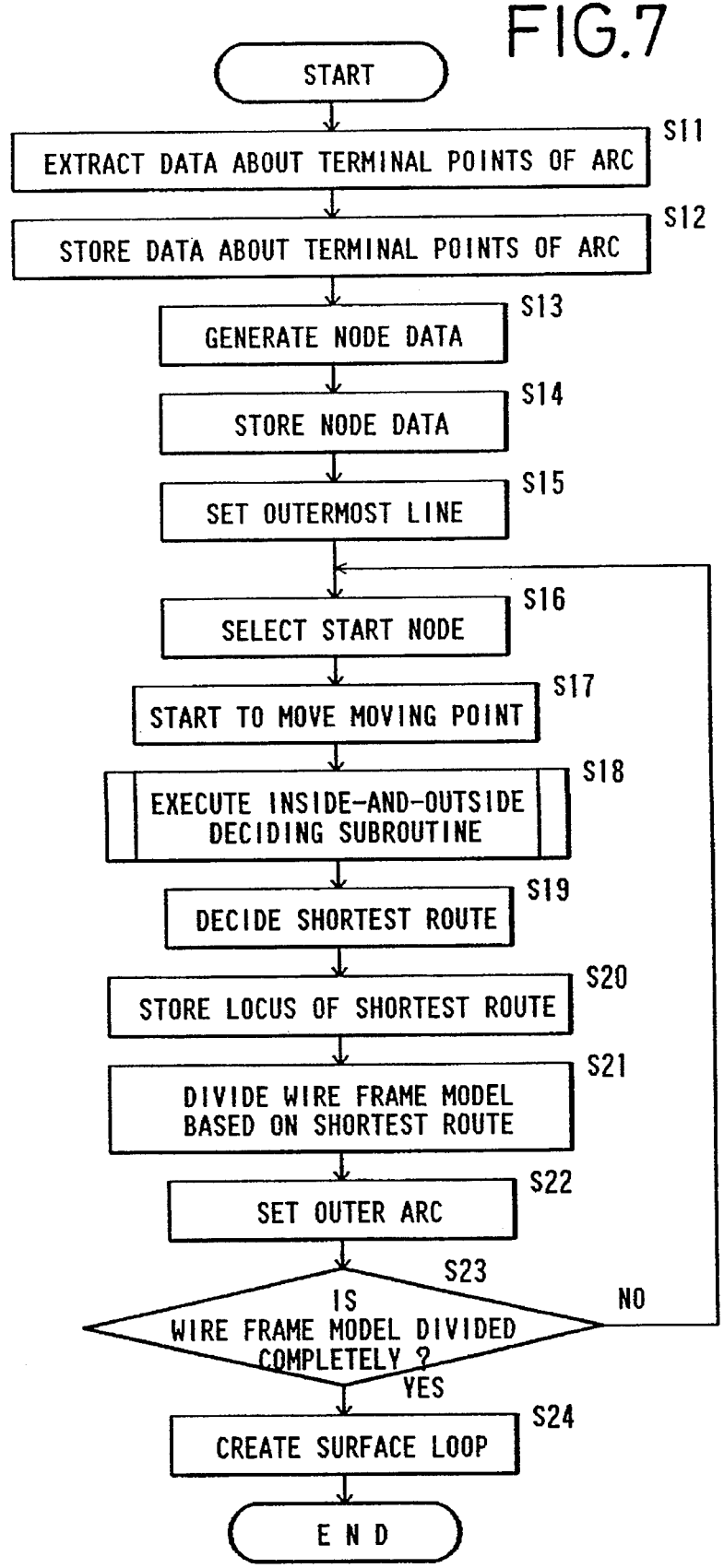
FIG. 7 is a flowchart for describing, in detail, a sequential operation on the flowchart shown in FIG. 4, for creating surface loops.

Next, the operator corrects undesired conditions or non-conformity (see * in FIG. 5) of the rough wire frame model displayed on the display unit 16, e.g., endpoints which do not intersect other endpoints, or unnecessary arcs or the like to thereby create or produce a complete wire frame model WF (Step S3) (see FIG. 6). Then, the produced wire frame model WF is divided into parts along respective arcs to thereby generate data about surface loops (Step S4).

Further, the respective surface loops are associated with each other and stored in the mass storage system 14. Thereafter, data about solid surfaces are fixed or extended onto the respective surface loops, so-called surface setting or fixing is carried out (Step S5). The data about the solid surfaces obtained by the surface fixing are stored in the mass storage system 14 as basic data used upon fabricating a press mold or the like.

A routine procedure in Step S4 for producing the surface data from the complete wire frame model WF created in Step S3 will now be described below in detail with reference to FIGS. 7 through 14.

Respective arcs L1 through Ln forming the wire frame model WF are represented by three-dimensional coordinate data about endpoints and equations indicative of curves. The CPU 30 extracts start-and-end points data P1 through Pn represented by the three-dimensional coordinate data (see FIG. 8) (Step S11) and causes the start-and-end points data memory circuit 36 to store the start-and-end points data P1 through Pn therein as a look-up table (hereinafter called an "LUT") (see FIG. 9) (Step S12).

Next, the node data generating circuit 38 generates node data from the start-and-end points data P1 through Pn under the control of the CPU 30 (Step S13). Thereafter, the CPU 30 causes the node data memory circuit 40 to store the generated node data therein as the LUT (see FIG. 10) (Step S14).

When the operator designates or specifies desired surface loops each corresponding to the minimum unit from the wire frame model WF, e.g., an outer arc (hereinafter called "outermost line") using the mouse 22 (see a thick line in FIG. 8) (Step S15), the CPU 30 causes the RAM 32 to store data about the outermost line therein as data used for surface loop retrieval. Further, the CPU 30 selects a start node based on the outermost line data, the start-and-end points data P1 through Pn, the node data and the start node selective references stored in the start node selective reference memory circuit 42 in advance (Step S16).

The references for reliably and rapidly selecting a desired start node have been stored in the start node selective reference memory circuit 42. The priority of the stored selective references will be shown as follows:

1. A node, which exists on a line segment on which an outermost line and an outer arc to be described later are superimposed, and lies between both ends of the outermost line exclusive of nodes at both ends thereof, is defined as the start node.
2. A node located at the intermediate position on a division line is defined as the start node.
3. Each of nodes other than the points described in the above items 1 and 2 is defined as the start node.
4. Where arcs that a moving point S can trace are not connected to each other even in the case of a node on an outer arc, the node is not regarded as the start node.

When a node P3, for example, is selected as the start node based on the priority of the start node selective references, the arc selecting circuit 46 selects arcs that the moving point S can trace, in accordance with the arc selective references stored in the arc selective reference memory circuit 44.

The arc selective references stored in the arc selective reference memory circuit 44 will be shown as follow:

1. The moving point S is forbidden to pass through the same node.
2. The moving point S is forbidden to select an arc on which an arrival or attained node becomes identical to the start node.
3. The moving point S is forbidden to trace an outer arc.
4. The moving point S is forbidden to reversely move toward the traced arc.

Figure 8:
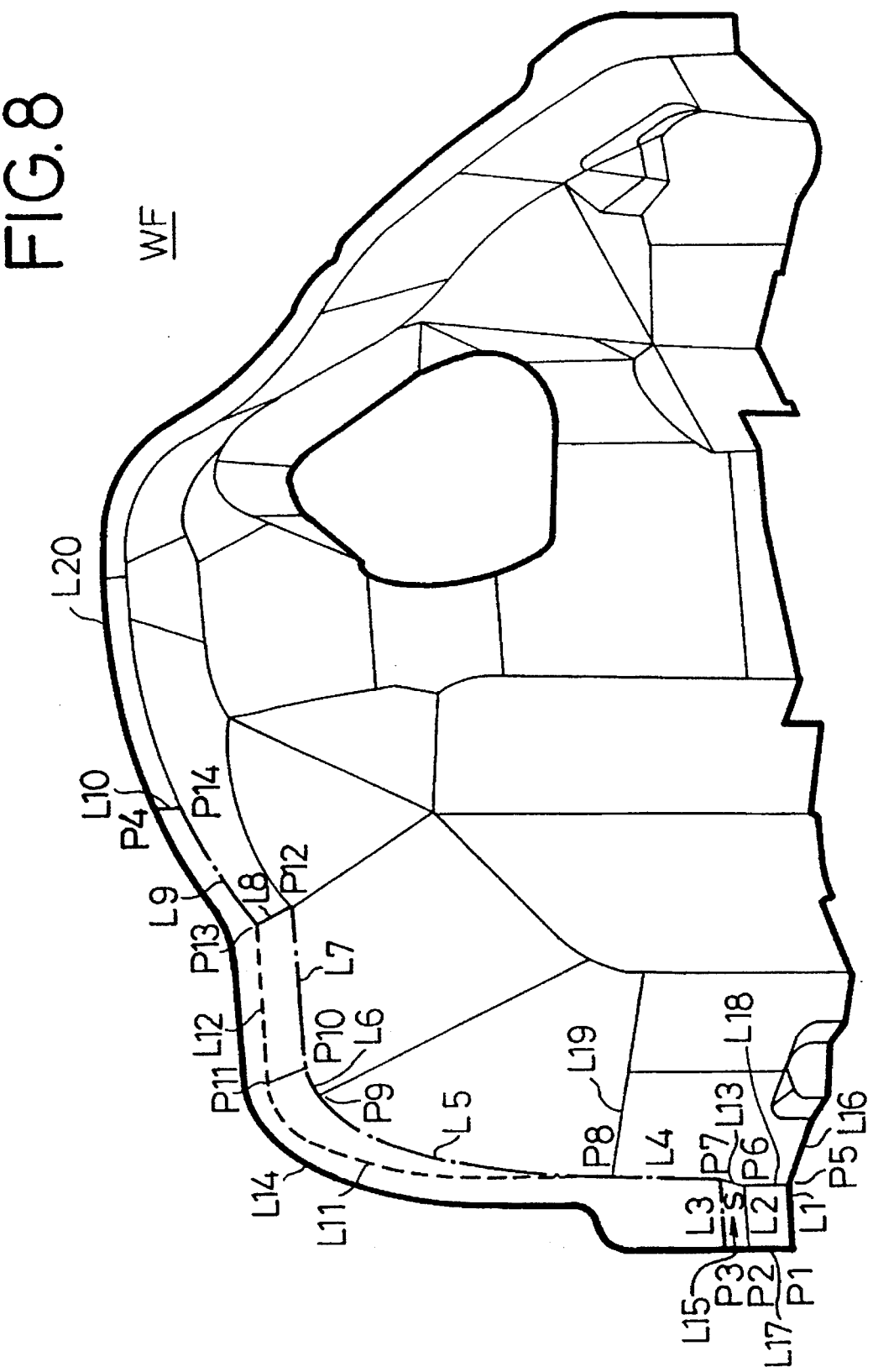
FIG. 8 is a view for explaining the outermost line set in accordance with the flowchart shown in FIG. 7.
Figure 11:
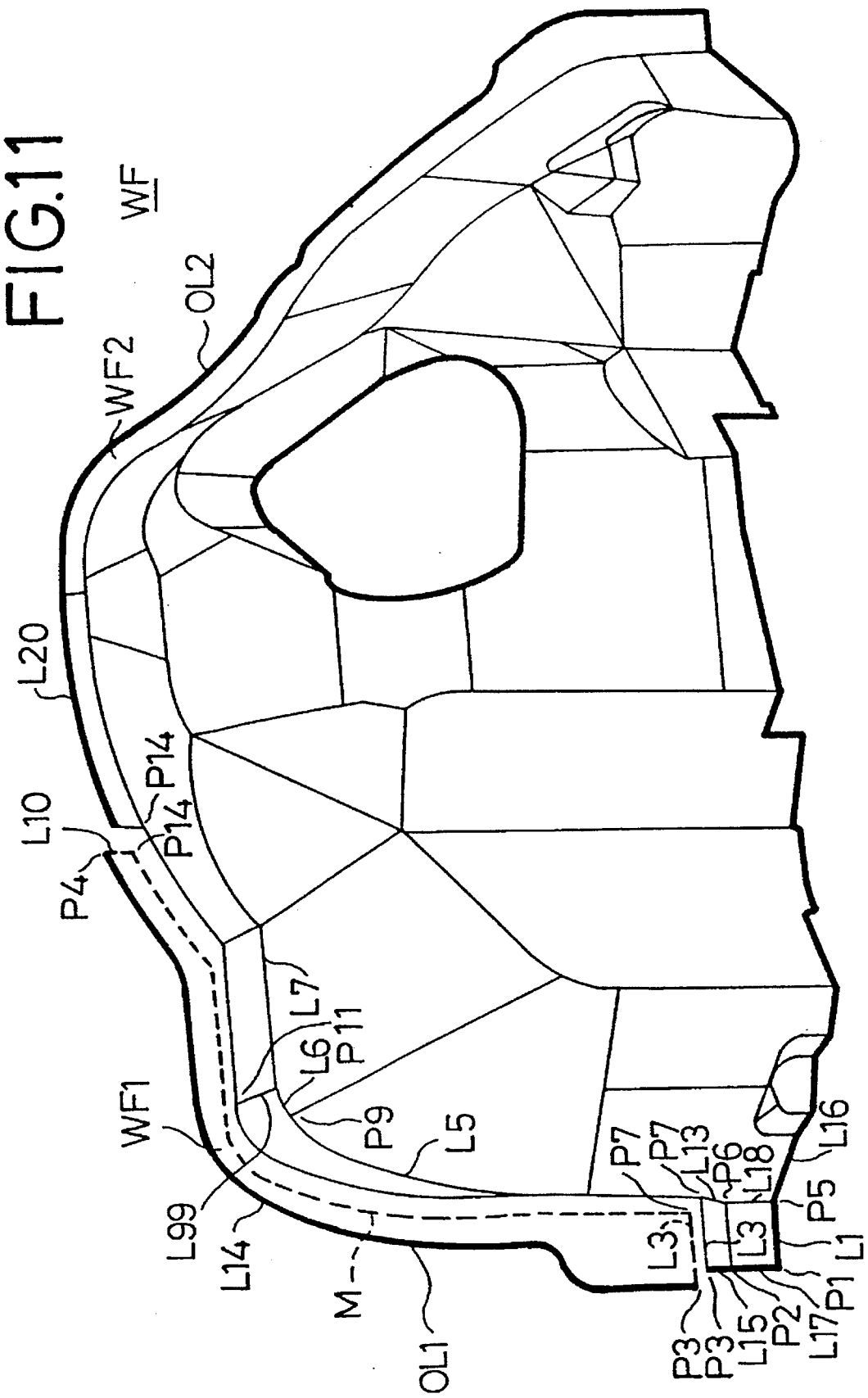
FIG. 11 is a view for explaining wire frame models divided in accordance with the flowchart shown in FIG. 7.

The arc selecting circuit 46 deletes the arcs L14 and L15 based on the arc selective references and selects the arc L3 (see FIG. 8). Thereafter, the CPU 30 causes the moving point S to trace points from the start node P3 to a node P7 along the arc L3 (Step S17).

When the arc selecting circuit 46 selects a desired arc at the node P7 in accordance with the arc selective references, the arc L3 is deleted in accordance with the item 4 of the arc selective references and either the arc L4 or L13 can be selected. Thus, if a plurality of arcs L4 or L13 can be selected, then the arc selecting circuit 46 selects the arc L4, for example, at random.

The moving point S which has started moving from the start node P3 in the above-described manner, traces or follows up the respective arcs L3, L4, L5, L6, L7, L8, L9 and L10 selected by the arc selecting circuit 46 in accordance with the arc selective conditions described in the above items 1 to 4 through their corresponding nodes P7, P8, P9, P10, P12, P13 and P14 so as to reach the node P4 on the outermost line.

When the moving point S reaches the node P4 on the outermost line, the arc inside-and-outside deciding circuit 48 executes an arc inside-and-outside deciding subroutine for deciding whether or not the arcs L3, L4, L5, L6, L7, L8, L9 and L10 that the moving point S has traced, fall within a desired wire frame model (Step S18).

If it is found out from the result of decision that the above arcs L3, L4, L5, L6, L7, L8, L9 and L10 fall within the desired wire frame model, then the shortest route deciding circuit 50 decides the shortest route between the start node P3 and the node P4 on the outermost line. When the L3, L4, L11, L12, L9 and L10, for example, are obtained (Step S19), the arcs L3, L4, L5, L6, L7, L8, L9 and L10 that the moving point S has followed up are corrected so as to become the arcs L3, L4, L11, L12, L9 and L10 forming the shortest route, thereby setting the resultant route as a division line M.

The division line M is stored in the moved locus memory circuit 52 as data (Step S20). Further, the wire frame model WF is divided into a wire frame model WF1 surrounded by the division line M and the outermost line corresponding to the arc L14 and a wire frame model WF2 surrounded by the division line M and the outermost lines other than the arc L14 (see FIG. 11) (Step S21).

The arcs L3, L4, L11, L12, L9, L10 and L14, which represent an outer contour of the wire frame model WF1 newly created by the above division, are represented as a contour or outer arc OL1, whereas the outermost lines other than the arcs L3, L4, L11, L12, L9, L10 and L14 which indicate an outer contour of the wire frame model WF2, are represented as an outer arc OL2 of the wire frame model WF2 (Step S22).

Next, the CPU 30 makes a decision as to whether or not the arcs to be divided exist in either the wire frame model WF1 or WF2 created by the above division, i.e., decides whether or not the wire frame model WF has been completely divided into corresponding models every arcs (Step S23). If the answer is NO in Step S23, then the routine is returned to Step S16, where a desired start node is selected again and either the wire frame model WF1 or WF2 is divided into corresponding models.

When the division of the wire frame model WF is completely finished in the above-described manner, respective wire frame models WF1 through WFn, which have been brought to the minimum units, are determined to be surface loops represented as the minimum units and surface-loop data are created based on the surface loops (Step S24).

Figure 12:
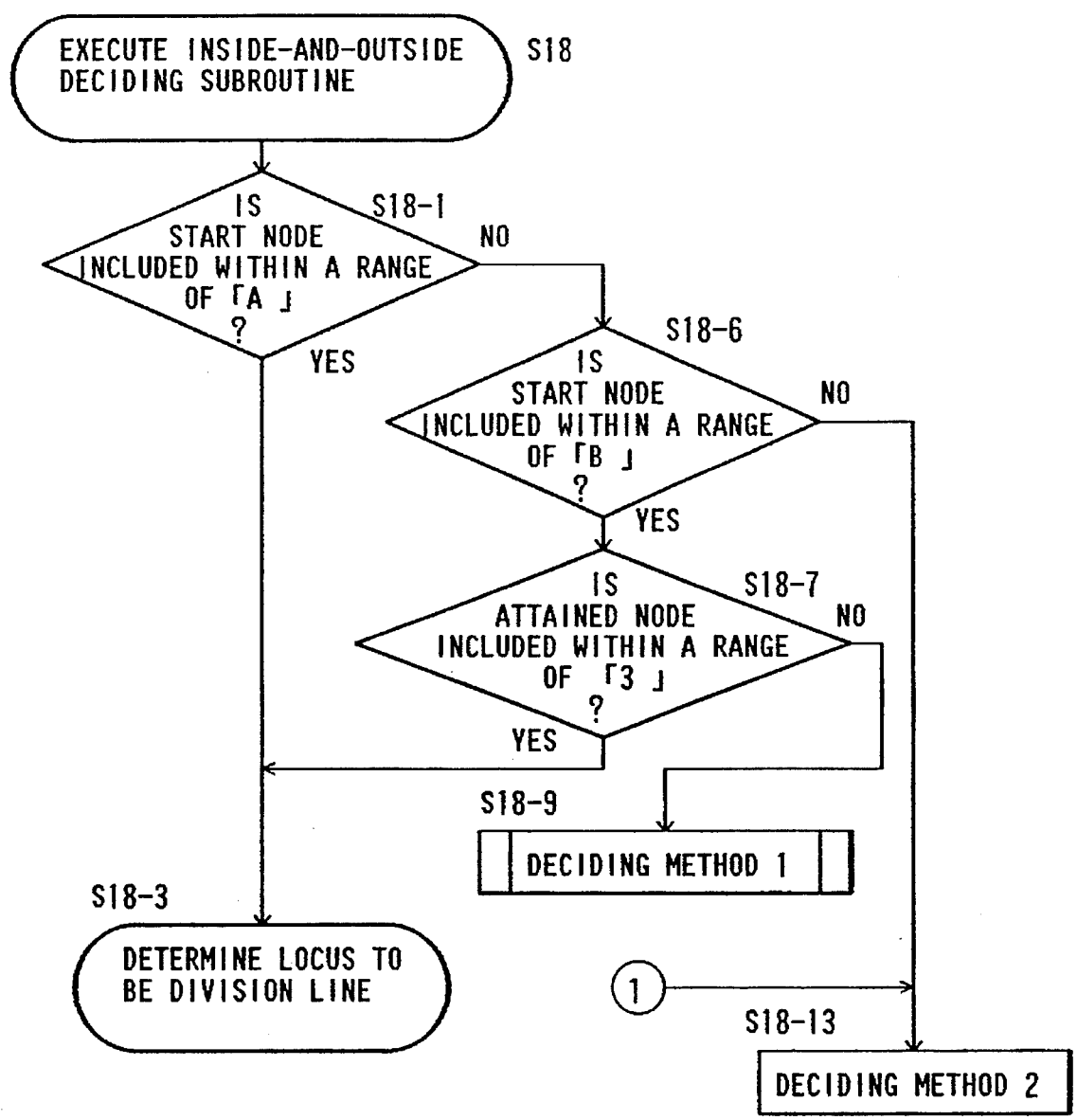
FIG. 12 is a view for describing the operation of a outside-connected-arc deciding subroutine on the flowchart shown in FIG. 7.

A deciding method of the arc inside-and-outside deciding subroutine in Step S18 will next be described with reference to a flowchart shown in FIG. 12.

The arc inside-and-outside deciding subroutine is used to decide whether or not the resultant division line falls within a desired wire frame model. In this deciding method, a decision is made based on the selected start node and the attained node.

The start nodes selected by the CPU 30 are classified into the following nodes:

A. A node which exists on a line segment on which the outermost line and an outer arc are superimposed and lies between both ends of the outermost line exclusive of nodes at both ends thereof.
B. A node located at the intermediate position on a division line.
C. Nodes other than the points described in the above items A and B.

On the other hand, nodes (hereinafter called "attained nodes") on outer arcs that the moving point S has reached, are classified into the following nodes:

1. A node which exists on a line segment on which the outermost line and an outer arc are superimposed and lies between both ends of the outermost line exclusive of nodes at both ends thereof.
2. Nodes on a division line.
3. Nodes other than the nodes described in the above items 1 and 2.

Then, the arc inside-and-outside deciding circuit 48 makes a decision as to whether or not the start node falls within the item ⌈A⌋, that is, it is the node which exists on the line segment on which the outermost line and the outer arc are superimposed and is located at the intermediate position or point exclusive of the nodes at both ends of the outermost line (Step S18-1). If the answer is YES in Step S18-1, it is then decided that the resultant locus of the moving point S falls within a wire frame model formed by a desired outer arc and can be regarded as a division line M (Step S18-3).

In this case, the outermost line corresponds to a arc corresponding to an outer contour of the wire frame model WF and any arc does not exist outside the outermost line.

Therefore, when the start node falls within the term ⌈A⌋, i.e., it corresponds to the node existing on the line segment on which the outermost line and the outer arc are superimposed and lying between both ends of the outermost line exclusive of the nodes at both ends thereof, the moving point S selects an inner arc without fail. Thus, the CPU 30 decides the locus of the moving point S as being a division line regardless of the attained node.

If the answer is NO in Step S18-1, it is then decided whether or not the start node falls within the item ⌈B⌋, i.e., it corresponds to the node located at the intermediate position on the division line (Step S18-6). If the answer is YES in Step S18-6, it is then determined whether or not an attained node falls within the item ⌈3⌋ (Step S18-7). If the answer is YES in Step S18-7, it is then decided that the locus of the moving point S is of a division line. If the answer is NO in Step S18-7, a decision to be made as to whether or not the locus of the moving point S can be brought to a division line M is executed in accordance with a subroutine for a deciding method 1 (Step S18-9).

If the answer is NO in Step S18-6, then a decision to be made as to whether or not the locus of the moving point S can be brought to a division line is executed in accordance with a subroutine for a deciding method 2 (Step S18-13).

Figure 13:
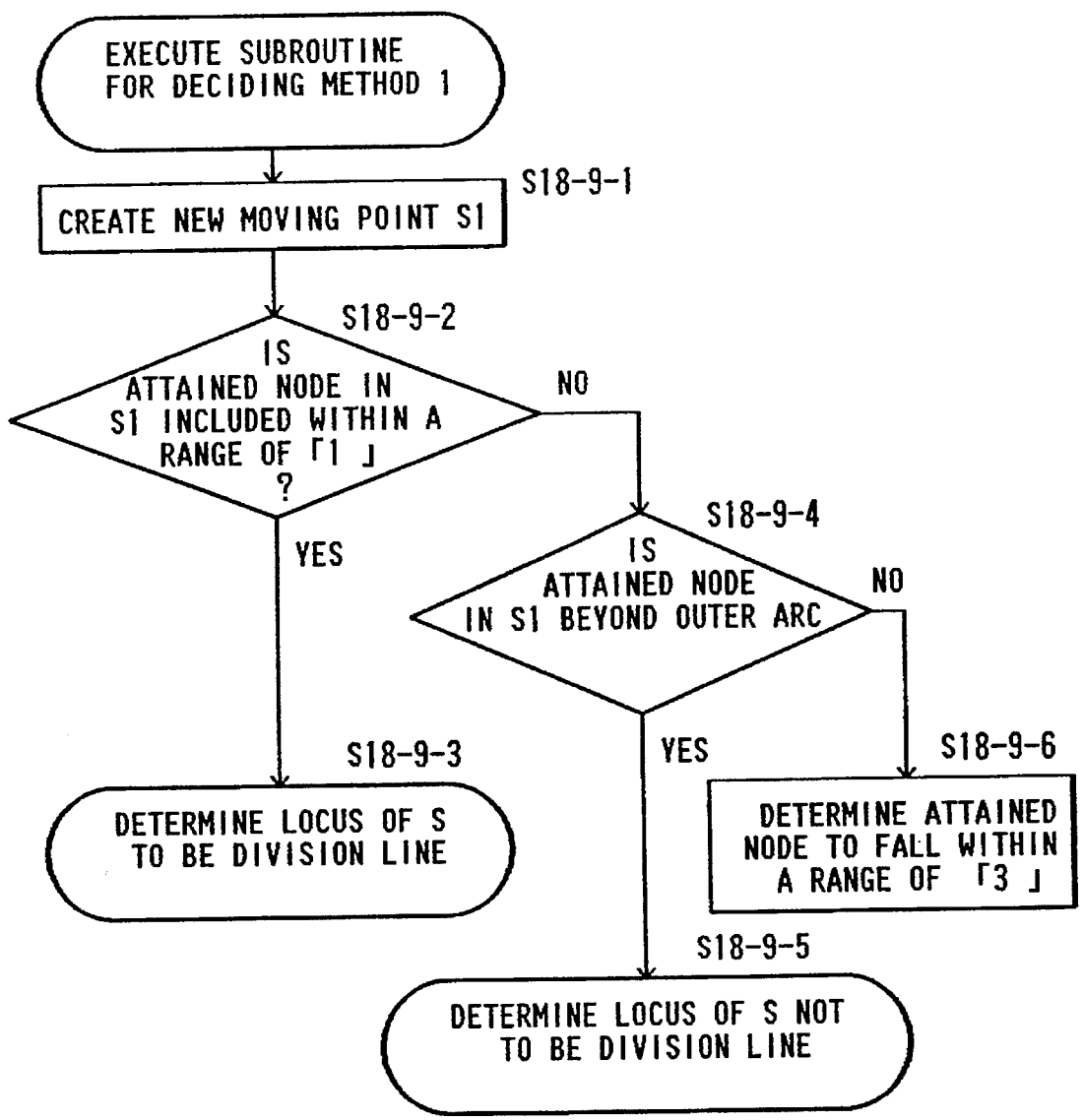
FIG. 13 is a flowchart for describing the operation of a subroutine for a deciding method 1 on the flowchart shown in FIG. 12.

The subroutine for the deciding method 1 in Step S18-9 will now be described below with reference to a flowchart shown in FIG. 13.

The CPU 30 generates a new moving point S1 (Step S18-9-1) and moves it from the start node P3 of the moving point S to the next node P7 thereof. Thereafter, the CPU 30 displaces the new moving point S1 within the wire frame model while selecting an arc different from each of the arcs that the moving point S traces to thereby cause the moving point S1 to reach a node on an outer arc.

It is decided whether or not the attained node on the outer arc exist on a line segment on which the outermost line and the outer arc are superimposed and corresponds to the node between both ends of the outermost line exclusive of the nodes at both ends thereof (Step S18-9-2). If the answer is YES in Step S18-9-2, then the locus of the moving point S is determined to be a division line (Step S18-9-3). If the answer is NO in Step S18-9-2, it is then decided whether or not an attained node of the new moving point S1 is out of a desired outer arc (Step S18-9-4). If the answer is YES in Step S18-9-4, it is then decided that the locus of the moving point S does not represent the division line (Step S18-9-5).

If the answer is NO in Step S18-9-4, it is then decided that the attained node of the new moving point S1 falls within the item ⌈3⌋ (Step S18-9-6). Further, a decision to be made as to whether or not the locus of the moving point S can be brought to the division line is executed in accordance with the subroutine for the deciding method 2 in Step S18-13.

In this case, the above decision is executed by moving the generated new moving point S1 so as to reach the node on the outer arc within the same wire frame model as one used for the moving point S and determining whether or not the outer arc having the node that the moving point S has reached, corresponds to a desired outer arc.

Figure 14:
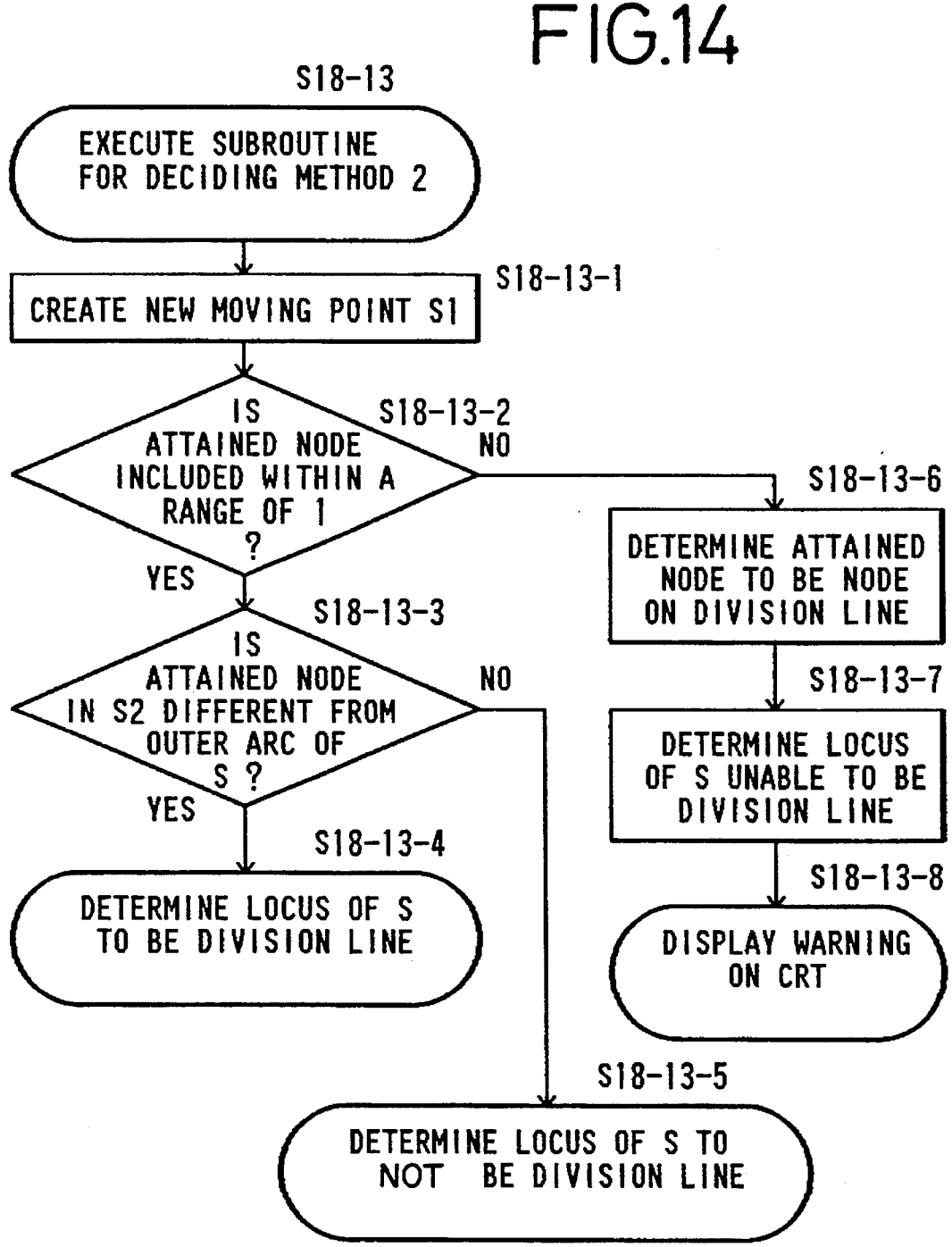
FIG. 14 is a flowchart for describing the operation of a subroutine for a deciding method 2 on the flowchart shown in FIG. 12.

In the subroutine for the deciding method 2, a new moving point S2 is produced as indicated by a flowchart in FIG. 14 (Step S18-13-1). A start node of the new moving point S corresponds to a node lying between the start node of the moving point S and the attained node and is regarded as being on a division line.

Next, the new moving point S2 is moved in a direction opposite to the direction of formation of the locus of the moving point S. It is then decided whether or not an attained node corresponds to ⌈a node existing on a line segment on which the outermost line and the outer arc are superimposed and lying between both ends of the outermost line exclusive of nodes at both ends thereof⌋ (Step S18-13-2). If the answer is YES in Step S18-13-2, it is then decided whether or not the outer arc including the attained node differs from an outer arc set upon displacing the moving point S (Step S18-13-3).

If the answer is YES in Step S18-13-3, then the locus of the moving point S is determined to be a division line (Step S18-13-4). If the answer is NO in Step S18-13-3, it is then decided that the locus of the moving point S does not correspond to the division line (Step S18-13-5).

If the answer is NO in Step S18-13-2, it is then decided that the attained node corresponds to a node on the division line (Step S18-13-6). It is thus determined that a decision to be made as to whether the locus of the moving point S corresponds to the division line is inexecutable (Step S18-13-7). Therefore, a warning is displayed on a CRT (Step S18-13-8).

When the produced new moving point S2 is moved within a wire frame model different from that used for the moving point S so as to reach a node on an outer arc, it is decided whether or not this outer arc is identical to the outer arc set upon displacing the moving point S, whereby a decision is made as to whether or not the locus of the moving point S corresponds to a locus obtained when the moving point S is moved within an area set by desired outer arcs.

According to the present embodiment, as has been described above, the node data is generated from the start-and-end points data of each arc. The start node of the moving point S is selected based on the node data, the set outermost line and the preset start node selective references. Next, the arc traced by the moving point S is selected in accordance with the arc selective references for each node. Thus, the moving point S is moved so as to travel from the selected arc to the node on the outer arc. Then, a decision is made, based on the arc inside-and-outside deciding routine, as to whether or not the locus of the moving point S corresponds to one obtained by causing the moving point S to trace the inside of a desired wire frame model.

When it is decided based on the deciding routine that the locus of the moving point S corresponds to the above locus obtained within the desired wire frame model, the shortest route between the start node and the attained node is determined by computation. The determined shortest route is set as the division line and the wire frame model WF is divided into the corresponding models.

Next, the arcs surrounding the respective divided wire frame models are set as the outer arcs. Further, the division of the wire frame model is repeated until the arcs to be divided are brought to nothing. As a result, the wire frame model can be easily and rapidly divided into parts up to the surface loops each corresponding to the minimum unit, thereby making it possible to easily carry out a surface-fixing process.

SECOND EMBODIMENT

Figure 15:
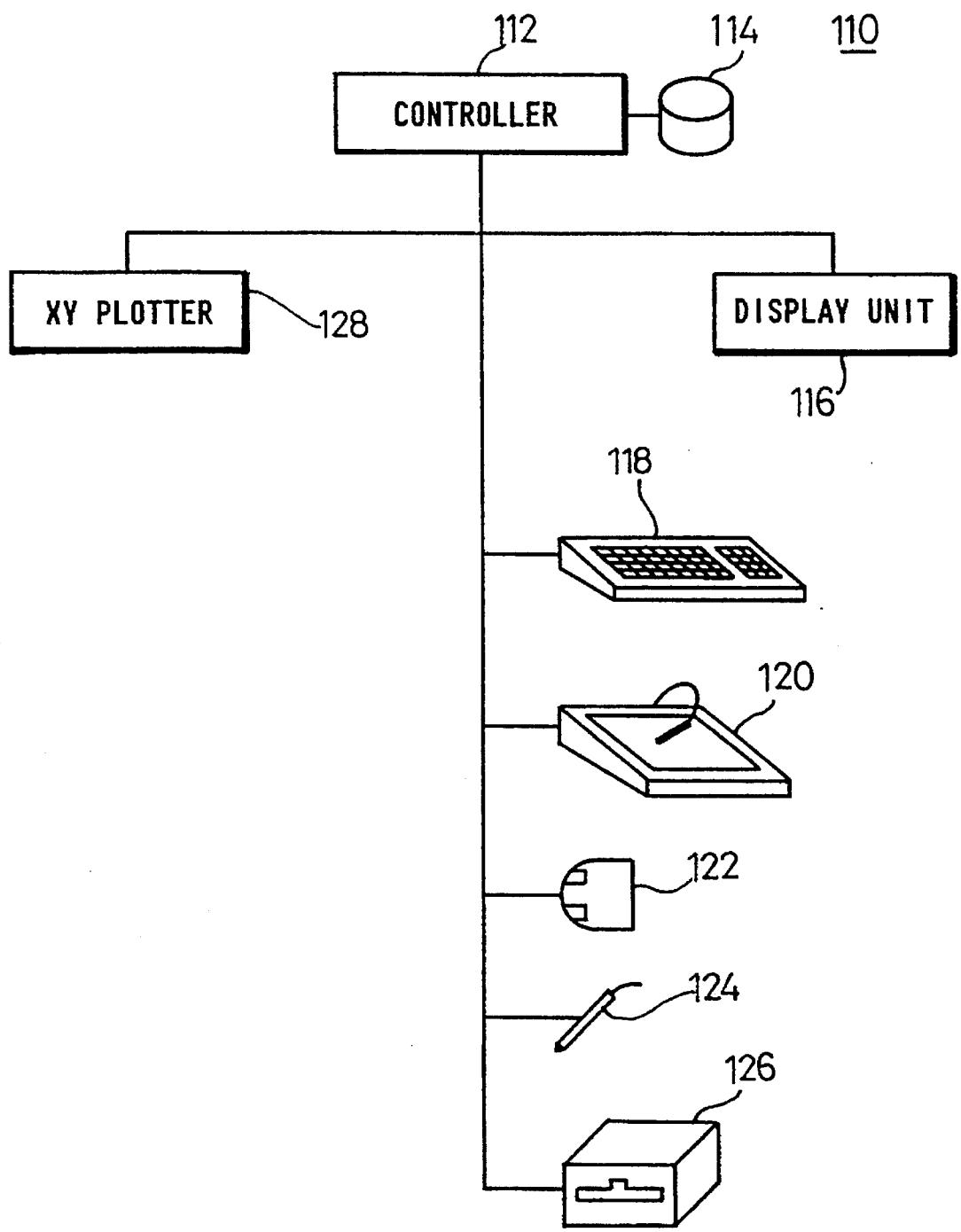
FIG. 15 is a block diagram showing the structure of a CAD system corresponding to a solid model producing system according to a second embodiment of the present invention.
Figure 16:
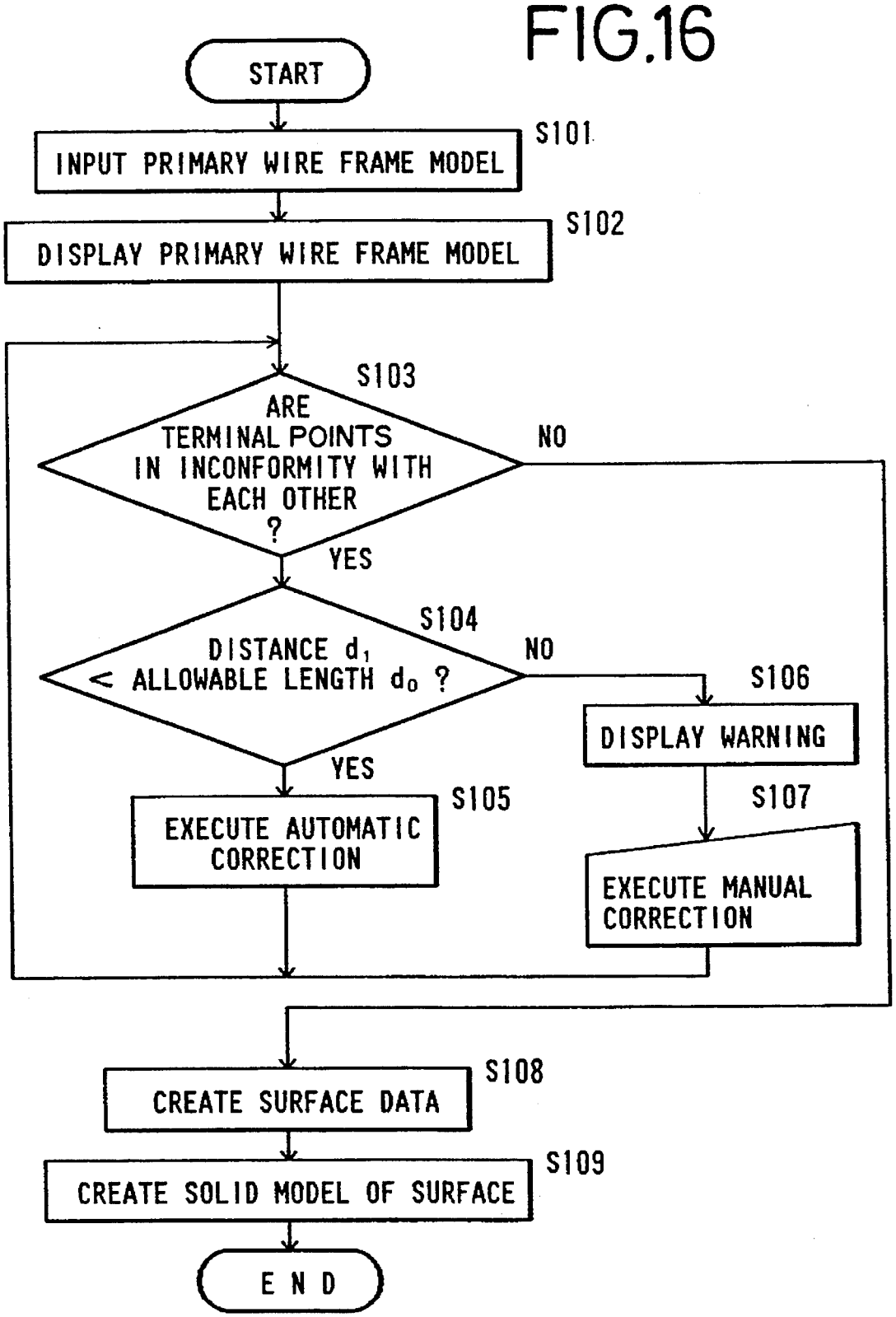
FIG. 16 is a flowchart for describing a method of producing solid models of respective surfaces from a rough wire frame model by the CAD system shown in FIG. 15.
Figure 17:
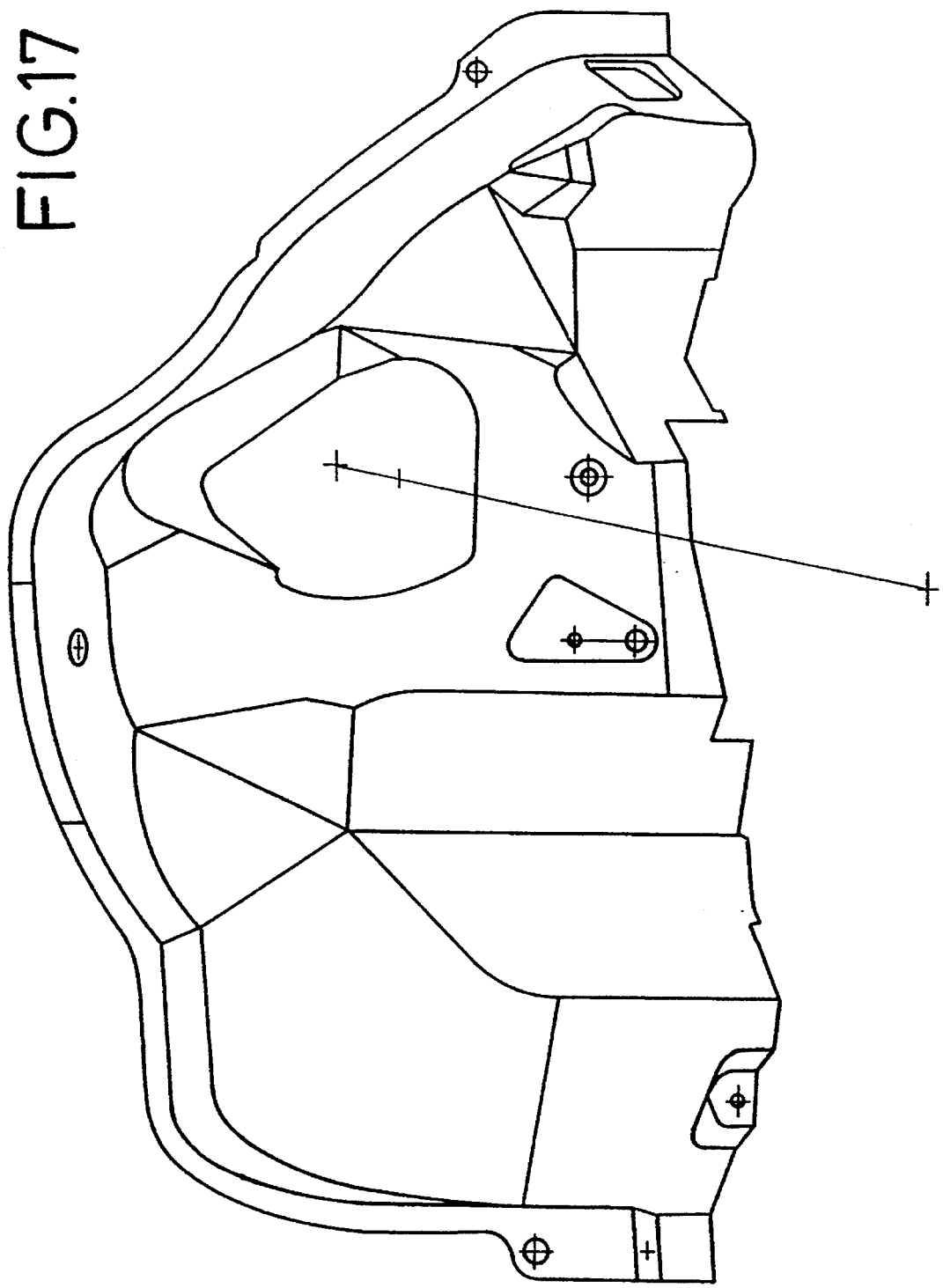
FIG. 17 is a view for explaining a rough wire frame model displayed on a display unit employed in the CAD system shown in FIG. 15.

FIG. 15 is a block diagram showing the structure of a CAD system 110 according to the second embodiment of the present invention. The CAD system 110 comprises a controller 112 which has a central processing unit and performs a graphic calculation, a graphic display control, data base management, etc., a mass storage unit 114 capable of preserving a large amount of graphic information and updating the same, a graphic-corresponding type display unit 116 serving as a centrally-operated device, which is used to display interactive talk between the CAD system 110 and an operator, a keyboard 118 used as an input device, a tablet 120, a mouse 122, a lightpen 124, a floppy disk driver (hereinafter called an "FDD") 126 and an XY plotter 128 used as a graphic output unit.

The controller 112 of the CAD system 110 has many programs similar to those shown in FIG. 3.

A description will now be made of an operation for creating solid models of surfaces from a rough wire frame model produced based on a mock-up model by using the CAD system 110 referred to above with reference to FIGS. 15 through 19.

CAD data about the rough wire frame model created in accordance with the mock-up model is first inputted from the FDD 126 and then read by the controller 112 (Steps S101).

Thereafter, the read CAD data is subjected to data conversion by a display module and a display library and then displayed on the display unit 116 (see FIG. 17) (Step S102).

Next, the controller 112 automatically inserts the minimum number of auxiliary line segments required to create surfaces into the rough wire frame model displayed on the display unit 116. Further, the controller 112 retrieves or detects whether or not there is an endpoint a which does not include a point intersecting either another arc or another endpoint (Step S103). If the answer is YES in Step S103, then a distance $d_1$ between the endpoint a and an arc or endpoint adjacent thereto is determined by computation. Further, it is decided whether or not the spaced-apart distance $d_1$ is less than a predetermined allowable value $d_0$ (Step S104).

If the answer is YES in Step S104, then the controller 112 performs an automatic correcting process for automatically associating the arc adjacent to the endpoint a or the endpoint adjacent thereto with the endpoint a (Step S105). If the answer is NO in Step S104, then the controller 112 makes a decision to the effect that an undesired or improper state has occurred and displays the undesired state at the endpoint displayed on the display unit 116 (see FIG. 19) (Step S106).

An operator manually corrects the endpoint a in conference with a designer and a person who has designed a rough wire frame model on displayed improper points (see * in FIG. 5) (Step S107).

A description will now be made of a process for correcting the endpoint a by the operator with reference to FIGS. 5 and 18.

Figure 18:
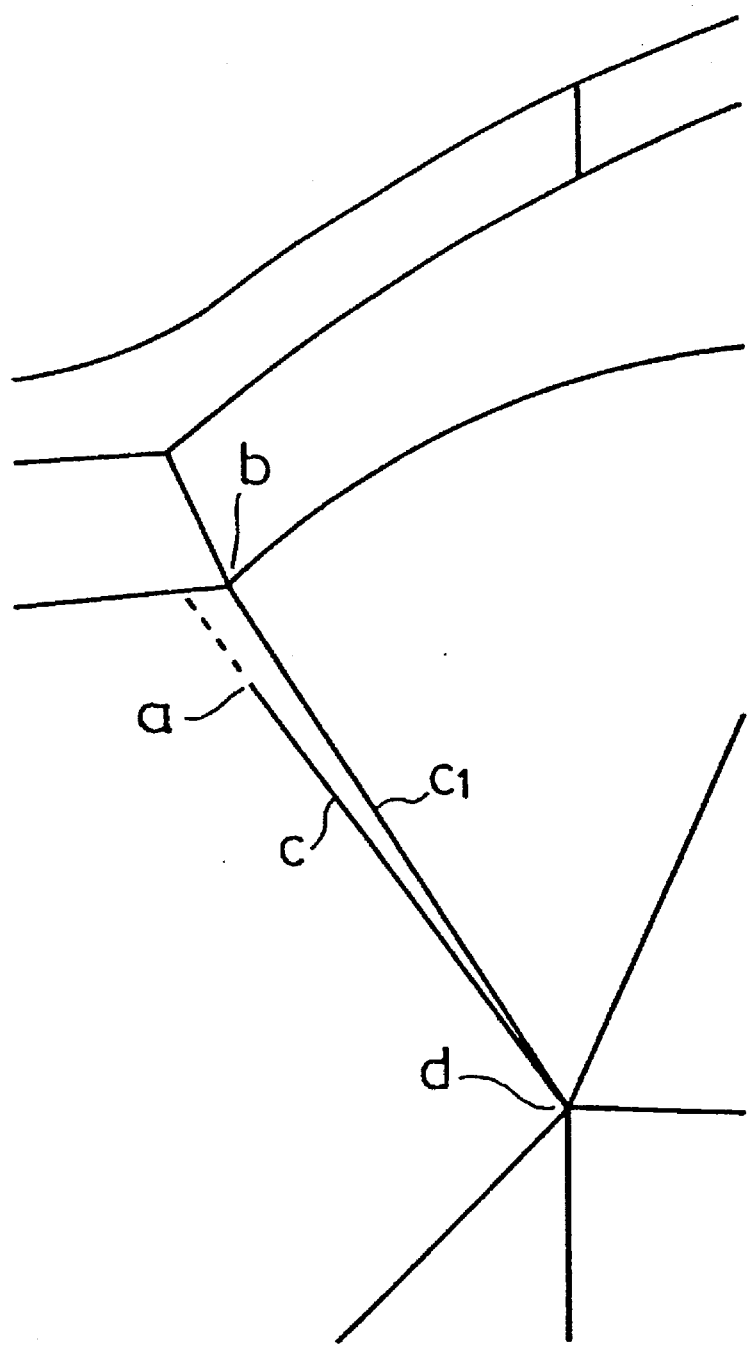
FIG. 18 is a view for describing a sequential operation for correcting defective points in the rough wire frame model by the CAD system shown in FIG. 15.
Figure 19:
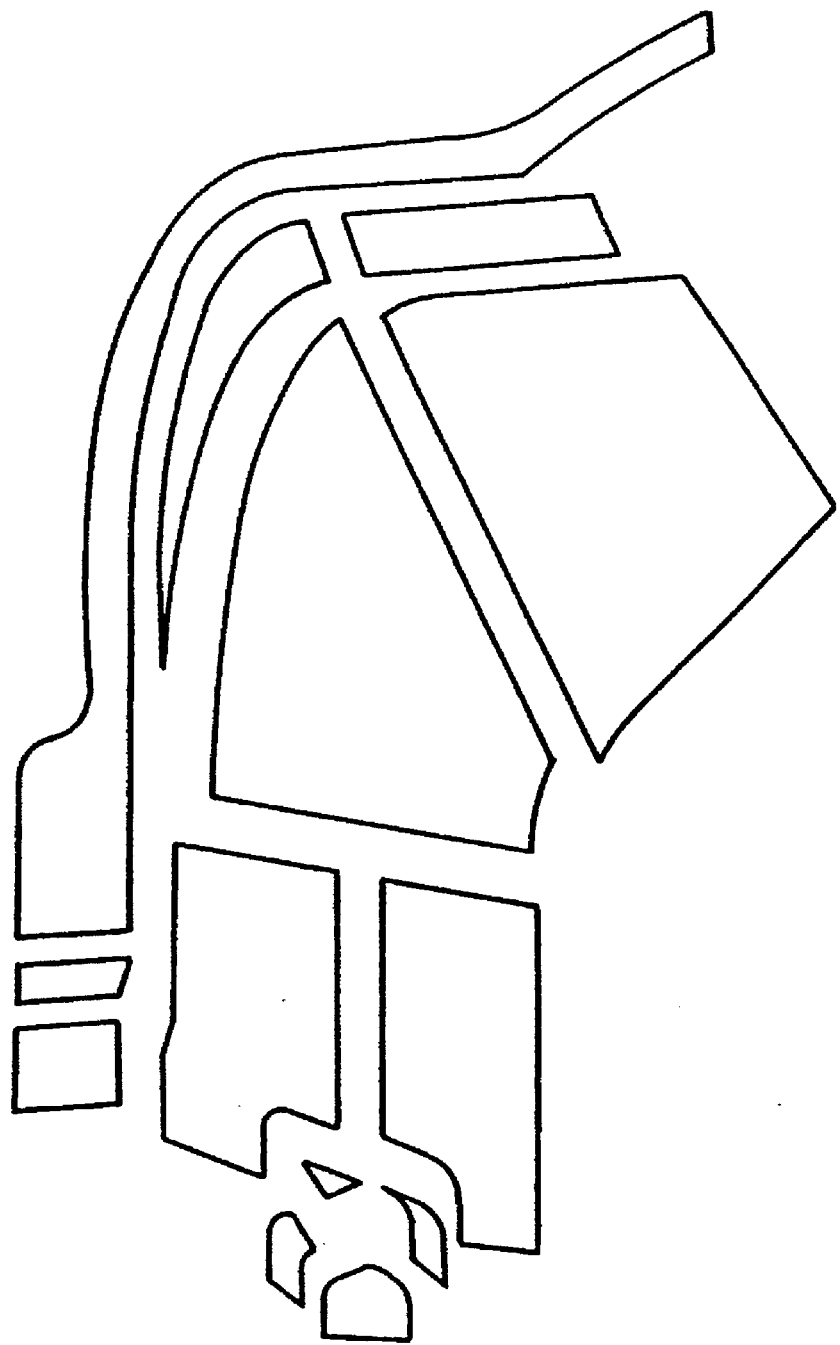
FIG. 19 is a view for describing respective surface loops created from the corrected wire frame model.

FIG. 18 is an enlarged view for describing a portion A shown in FIG. 5. In FIG. 18, the endpoint a is spaced away from the node b. Thus, the operator selects the endpoint a and the node b using the mouse 122 and inputs a correction executing instruction through the keyboard 118 to thereby connect the endpoint a to the node b. Accordingly, an arc c (between d and a) is corrected to an arc $c_1$ (between d and b).

If an arc f having an endpoint e shown in FIG. 5 is determined to be a surplus, then the operator deletes it.

Thus, data about respective surface loops are created from a corrected wire frame model (see FIG. 6) completed by correcting the discrepancy between the endpoints and deleting unnecessary arcs (see FIG. 19) (Step S108). Then, the respective surface loops are correlated to each other and stored in the mass storage unit 114.

Next, solid data about respective surfaces are generated from the data about the respective surface loops, so-called surface setting or fixing is carried out (Step S109). The solid data about the surfaces obtained by the surface fixing are stored in the mass storage unit 114 as basic data used upon fabricating a press mold or the like.

According to the present embodiment, as has been described above, it is retrieved or detected whether or not the endpoint which does not include the point intersecting another arc or another endpoint exists in the endpoints on all the arcs forming the rough wire frame model displayed on the display unit 116. When the endpoint which does not include the intersecting point referred to above is found out, the endpoint is automatically corrected based on the distance $d_1$ between the endpoint and the arc or endpoint adjacent thereto. Alternatively, the undesired or improper spots are displayed to urge the operator to correct the endpoint. It is therefore possible to easily correct the rough wire frame model in a short time.

THIRD EMBODIMENT

Figure 20A:
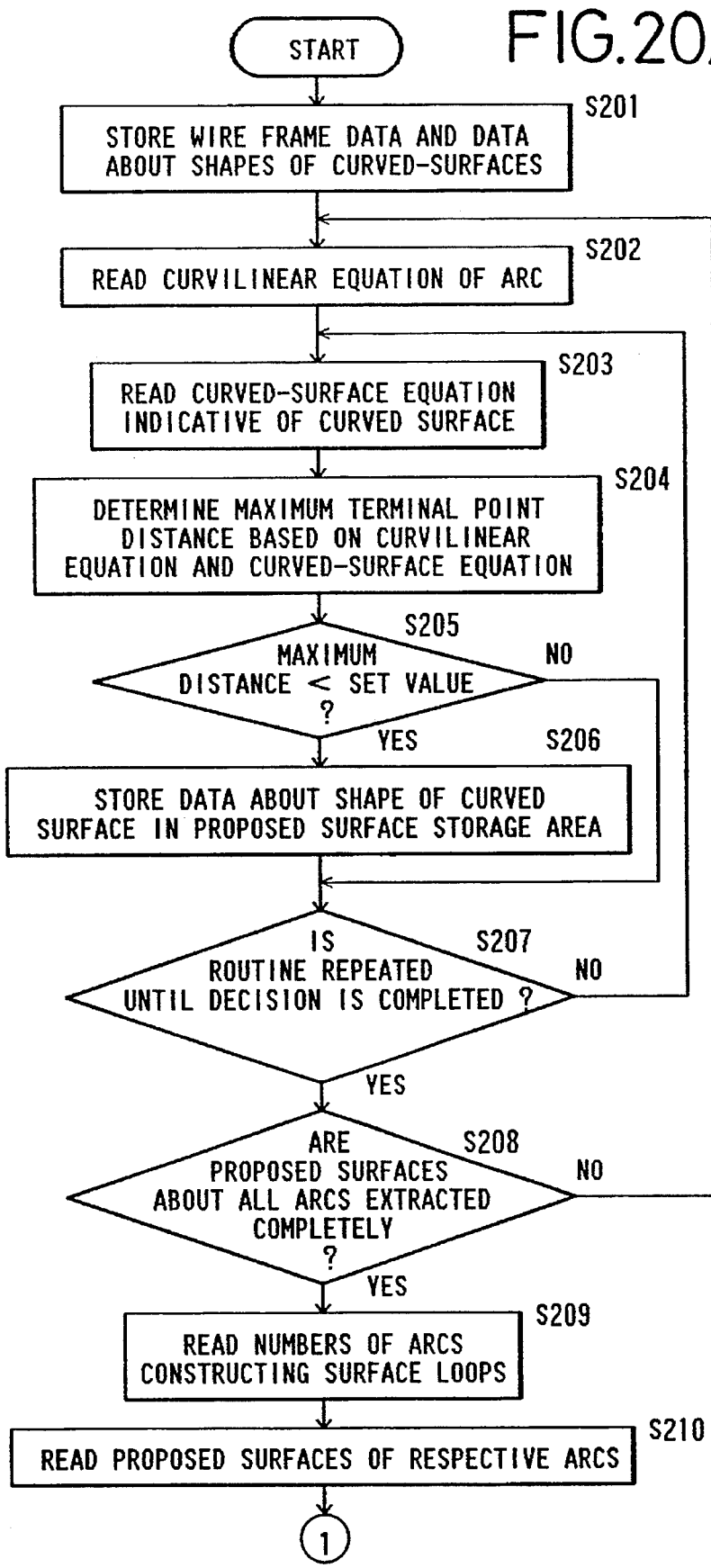
Figure 21:
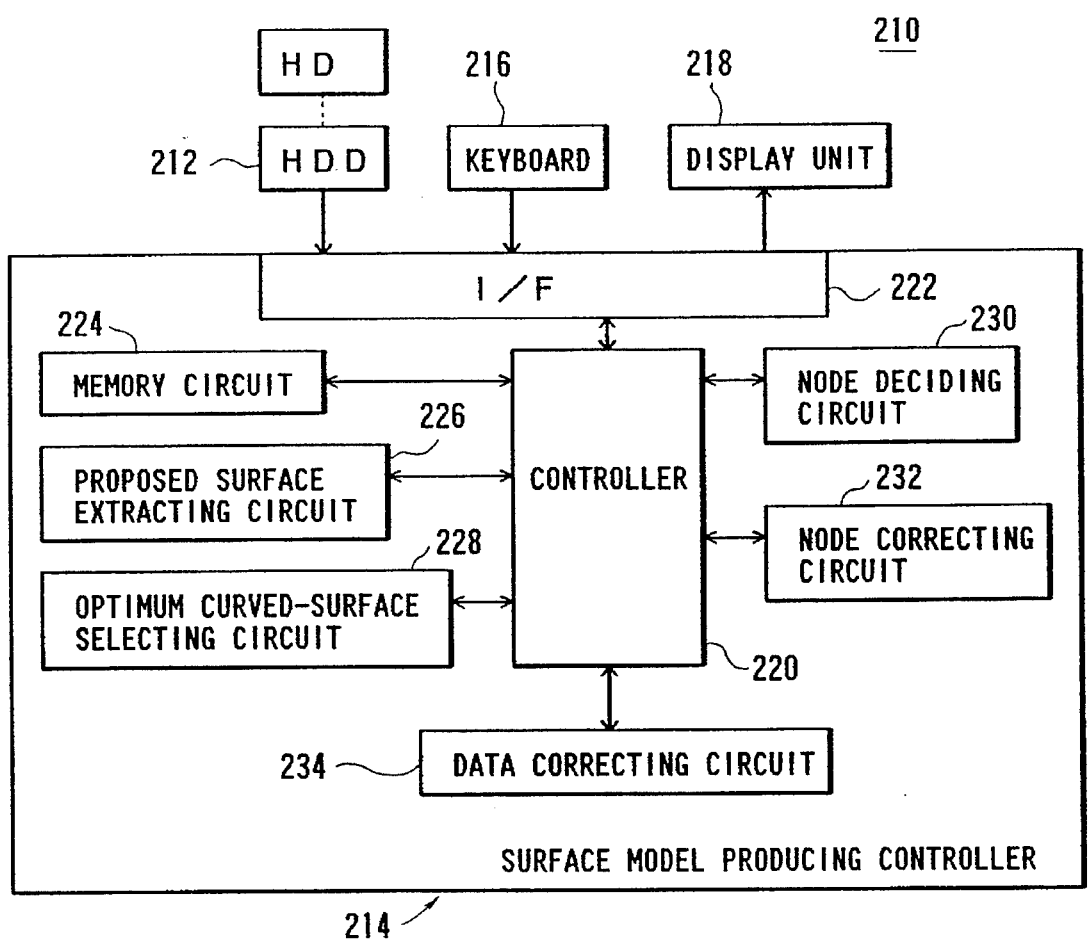
FIG. 21 is a block diagram showing the structure of a solid model producing system according to a third embodiment of the present invention.

FIGS. 20A and 20B are respectively flowcharts for describing a method of creating or producing solid models, according to the present invention. FIG. 21 is a block diagram showing the structure of a solid model producing system 210 according to the third embodiment of the present invention.

The solid model producing system 210 comprises a hard disk driver (hereinafter called an "HDD") 212 for driving a hard disk (hereinafter called an "HD") to read data (hereinafter called "wire frame data") W about a wire frame model in which an external or outward shape of the system is defined by points and lines, a surface model producing controller 214 for defining curved-surface shape data as closed or surface loops surrounded by arcs of the wire frame data W and generating data about a solid model of the system, i.e., a surface model, a keyboard 216 serving as an inputting device for entering a computational instruction or the like into the surface model producing controller 214 by an operator, and a display unit 218 for displaying the wire frame data W and the surface model thereon.

A description will now be made of a method of creating or producing the surface model from the wire frame data W using the solid model producing system 210 constructed as described above with reference to FIGS. 20A and 20B.

When the operator enters a data read instruction through the keyboard 216, the controller 220 of the surface model producing controller 214 reads the wire frame data W and the curved-surface shape data from the HD through an interface circuit (hereinafter called an "I/F") 222 and the HDD 212 and stores the same in a memory circuit 224 (Step S201). Further, the controller 220 causes the display unit 218 to display a wire frame model based on the wire frame data W.

Figure 22:
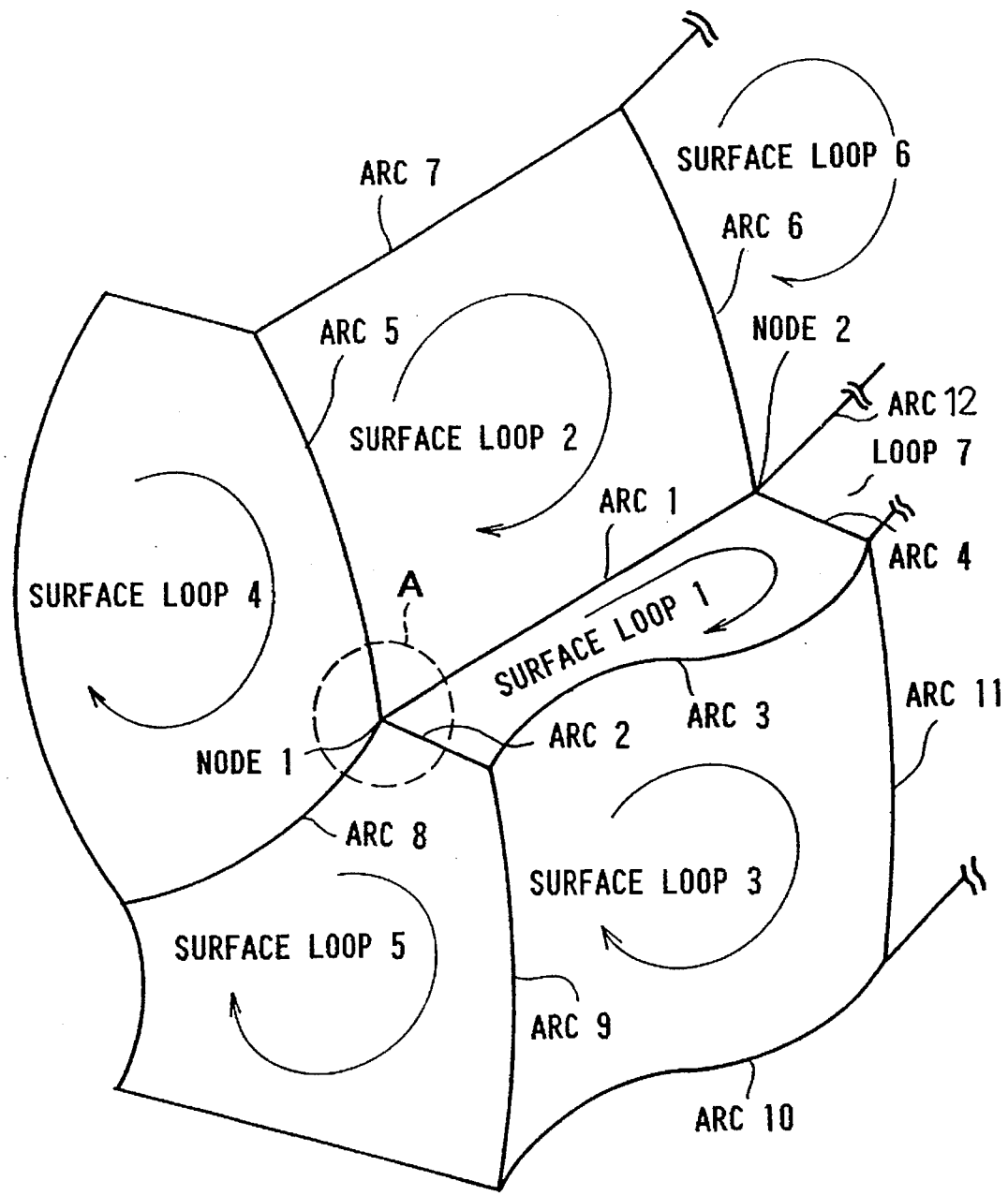
FIG. 22 is a view for describing a wire frame model displayed on a display unit employed in the solid model producing system shown in FIG. 21.
Figure 28:
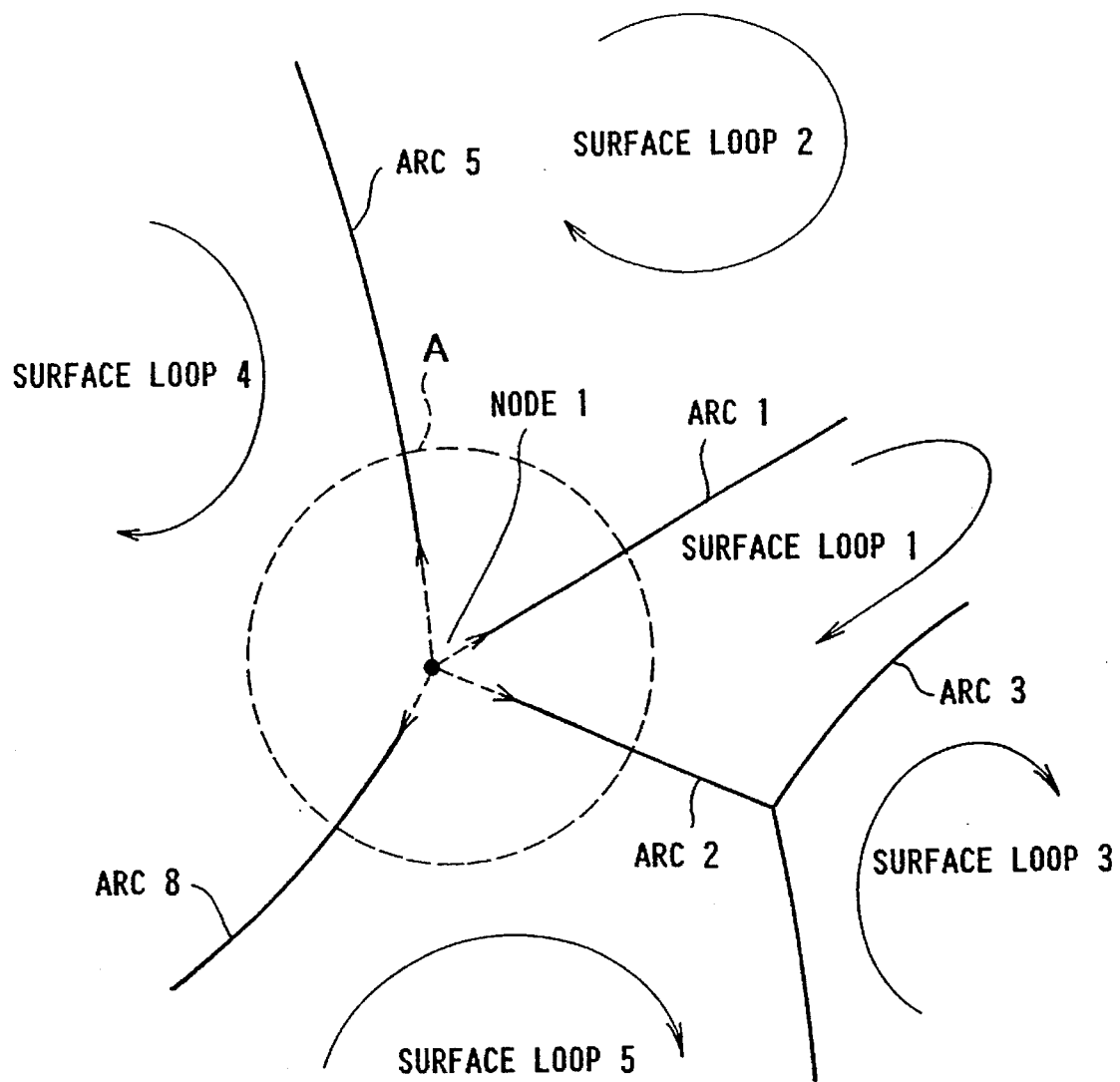
FIG. 28 is an enlarged view of a portion A of the wire frame model displayed on the display unit shown in FIG. 21 and a view for describing a method of correcting nodes when respective ends of arcs are not connected at each node.

FIG. 22 shows a portion of the wire frame model displayed on the display unit 218. FIG. 28 illustrates the wire frame data W and the curved-surface shape data stored in the memory circuit 224.

As is understood from FIG. 23, data about arcs 1 through $N_1$ of the wire frame data W are stored in arc data storage section of the memory circuit 224. Data about nodes 1 through $N_2$ to which endpoints of the arcs 1 through $N_1$ are coupled are stored in a node data storage section of the memory circuit 224. Data about surface loops 1 through $N_3$ surrounded by the arcs 1 through $N_1$ are stored in a surface-loop data storage section of the memory circuit 224.

Further, data about curved-surface shapes 1 through $N_4$ respectively selected so as to correspond to the surface loops 1 through $N_3$ are stored in a curved-surface shape data storage section of the memory circuit 224.

FIG. 24 shows the data about the arcs 1 through $N_1$ stored in the arc or ridgeline data storage section.

Each of the data about the arcs 1 through $N_1$ comprises an arc number, curvilinear equations of the arcs 1 through $N_1$, surface loop numbers to which the arcs 1 through $N_1$ belong, node numbers to which start points of the arcs 1 through $N_1$ belong and their coordinate values, and node numbers to which end points of the arcs 1 through $N_1$ belong and their coordinate values.

Further, the arc data storage section has proposed surface storage areas for storing therein data about proposed surfaces to be described later.

FIG. 25 shows the data about the nodes 1 through $N_2$ stored in the node data storage section.

Each of the data about the nodes 1 through $N_2$ comprises a node number, numbers of arcs coupled to the nodes 1 through $N_2$, and numbers of the surface loops related to the nodes 1 through $N_2$. Further, the node data storage section has node coordinate value storage areas for storing therein data about node coordinate values which will be determined by computation later.

Figure 26:
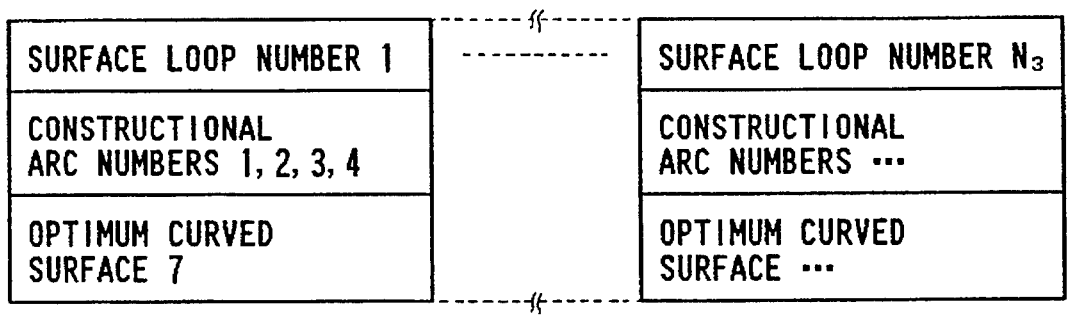
FIG. 26 is a view for describing surface loop data stored in a surface loop data storage section in the memory circuit shown in FIG. 23.

FIG. 26 shows the data about the surface loops 1 through $N_3$ stored in the surface-loop data storage section.

Each of the data about the surface loops 1 through $N_3$ comprises a surface loop number and numbers of the arcs forming or constructing each of the surface loops 1 through $N_3$, i.e., constructional arc numbers.

Further, the surface-loop data storage section has optimum curved-surface storage areas for storing therein shape data about the optimum curved surfaces respectively selected for the surface loops 1 through $N_3$ later.

Figure 27:
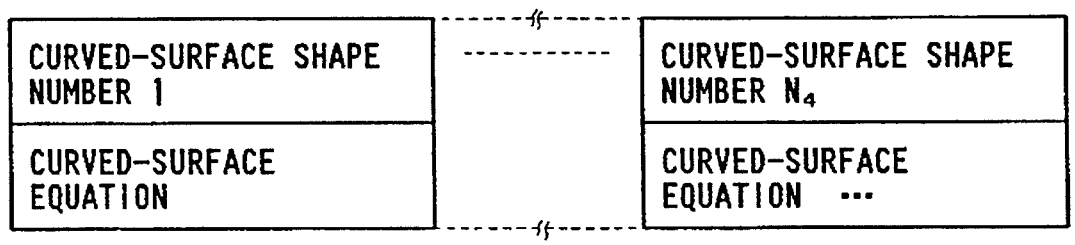
FIG. 27 is a view for describing curved surface shape data stored in a curved surface shape data storage section in the memory circuit shown in FIG. 23.

FIG. 27 illustrates the data about the curved-surface shapes 1 through $N_4$ stored in the curved-surface shape data storage section.

The data about the curved-surface shapes 1 through $N_4$ respectively comprise curved-surface shape numbers and curved-surface equations indicative of the shapes of the curved surfaces.

In this case, the arcs 1 through $N_1$, the nodes 1 through $N_2$ and the surface loops 1 through $N_3$ respectively include data associated with one another. However, these data and the curved-surface shapes 1 through $N_4$ do not include mutually-associated data respectively.

Thus, a proposed surface extracting circuit 226 reads the curvilinear equation of the arc 1 from the arc data storage section of the memory circuit 224 (Step S202) and reads the curved-surface equation of the curved-surface shape 1 from the curved-surface shape data storage section (Step S203).

Next, the proposed surface extracting circuit 226 superimposes curved lines formed by end surfaces of the curved surfaces forming the curved-surface shape 1 on a curved line formed by the arc 1 and replaces the curved line formed by the arc 1 by a set of points provided at predetermined intervals between both endpoints of the arc 1. Further, the proposed surface extracting circuit 226 generates line segments extending orthogonally to the curved lines formed by the end surfaces of the curved-surface shape 1 from the respective points and determines the lengths of these vertical line segments, i.e., distances between the curved line formed by the arc 1 and the curved lines formed by the end surfaces of the curved-surface shape 1. Moreover, the proposed surface extracting circuit 226 determines the maximum value (hereinafter called "maximum spaced-apart distance") from values indicative of these spaced-apart distances (Step S204).

The proposed surface extracting circuit 226 makes a decision as to whether or not the maximum spaced-apart distance is less than a predetermined value (Step S205). If the answer is YES in Step S205, it is then decided that one curved surface defined by the curved-surface shape 1 can be brought to a curved surface including the arc 1 (hereinafter called a "proposed surface"). The curved-surface shape number of this curved-surface shape 1 is stored as data in the proposed surface storage area used for the arc 1 (Step S206).

Similarly, the proposed surface extracting circuit 226 makes the above decision between the arc 1 and each of the remaining curved-surface shapes 2 through $N_4$ and decides whether or not each of curved surfaces represented by all the curved-surface shapes can be brought to the proposed surface (Step S207). That is, the curved-surface equations indicative of the subsequent curved-surface shapes, e.g., the curved-surface shapes 2, 3, ... $N_4$ are successively read in Step S203. The above Steps S204 through S206 are executed each time to thereby extract all the proposed surfaces with respect to the arc 1.

When all the proposed surfaces with respect to the arc 1 have been extracted completely, the proposed surface extracting circuit 226 makes a decision as to whether or not proposed surfaces with respect to all the other arcs have been extracted (Step S208). If the answer is NO in Step S208, then the routine is returned to Step S202, where the subsequent arcs, e.g., the arcs 2, 3, ..., $N_1$ are successively read and the above Steps S203 through S207 are executed every arcs 2, 3, ... $N_1$ to thereby extract all the proposed surfaces every arcs 2 through $N_1$. Thereafter, the extracted proposed surfaces are stored in their corresponding proposed surface storage areas of the arc data storage section.

Thus, data about a plurality of proposed surfaces extracted with respect to the arcs 1 through $N_1$ are stored in their corresponding proposed surface storage areas for the arcs 1 through $N_1$ (see FIG. 24).

Next, an optimum curved-surface selecting circuit 228 reads the numbers of the arcs constructing the surface loop 1, e.g., arcs 1, 2, 3 and 4 from the surface-loop data storage section of the memory circuit 224 (Step S209).

Further, the optimum curved-surface selecting circuit 228 reads, for example, the proposed surface 1 from the proposed surfaces stored as data in the proposed surface storage area for the arc 1, e.g., the proposed surfaces 1, 2, 7, 11 and 16 (Step S210). The maximum spaced-apart distance between the proposed surface 1 and each of the arcs 1, 2, 3 and 4 forming the surface loop 1 is determined in accordance with a method similar to that executed in Step S204.

Similarly, the optimum curved-surface selecting circuit 228 determines the maximum spaced-apart distance between each of other proposed surfaces 2, 7, 11 and 16 related to the arc 1 and each of the arcs 1, 2, 3 and 4. Further, the optimum curved-surface selecting circuit 228 determines the maximum spaced-apart distance between each of the proposed surfaces respectively stored as data in the proposed surface storage areas for the arcs 2, 3 and 4 and each of the arcs 1, 2, 3 and 4 forming the surface loop 1.

The proposed surface which minimizes the maximum spaced-apart distance, e.g., the proposed surface 7, is selected as the curved surface most suitable for the surface loop 1 from the respective proposed surfaces from which the maximum spaced-apart distances have been determined in the above-described manner (Step S211). The proposed surface 7 is stored in the optimum curved-surface storage area corresponding to the surface loop 1 as data (Step S212).

The optimum curved-surface selecting circuit 228 processes the surface loops 2 through $N_3$ in a manner similar to the surface loop 1, i.e., successively compares the respective arcs constructive of each of the surface loops 2 through $N_3$ with proposed surfaces related to these arcs and selects proposed surfaces capable of minimizing the maximum spaced-apart distances as curved surfaces most suitable for the surface loops 2 through $N_3$. Further, the selected proposed surfaces are stored in their corresponding optimum curved-surface storage areas for the surface loops 2 through $N_3$.

In accordance with the above-described Steps, data about the curved surfaces most suitable for the surface loops 1 through $N_3$ are respectively stored in the optimum curved-surface storage areas for the surface loops 1 through $N_3$.

Since the wire frame data W is created based on the mock-up model, the endpoints of the arcs are often brought into inconformity with each other at the nodes 1 through $N_2$.

Therefore, a node deciding circuit 230 makes a decision as to whether the respective endpoints of the arcs coincide with each other at the nodes. If the answer is No, then a node correcting circuit 232 corrects the respective endpoints referred to above.

Described specifically, the node deciding circuit 230 reads numbers of the arcs 1, 2, 5 and 8 coupled to the node 1 from the node data storage section of the memory circuit 224 (Step S213). Further, the node deciding circuit 230 reads coordinate values at start points of the arcs 1, 2, 5 and 8 from the arc data storage section (Step S214) and makes a decision as to whether or not the coordinate values at these start points coincide with each other (Step S215)

If the answer is NO in Step S215 (see FIG. 28), then the node deciding circuit 230 computes a coordinate value (hereinafter called "computed node") at a point where the sum of vectors directed to the respective start points is brought to zero (Step S216). Next, the node deciding circuit 230 decides whether or not the computed node exists on each of the optimum curved surfaces selected in Step S212, e.g., the optimum curved surfaces 7, 8, 5 and 3 selected for the surface loops 1, 2, 4 and 5 respectively (Step S217).

When it is decided that the coordinate value of the computed node exists on each of the optimum curved surfaces 7, 8, 5 and 3, the node correcting circuit 232 regards the computed node as a true node. The coordinate value of the computed node is stored in the node coordinate value storage area for the node 1, of the node data storage section. Further, each of the coordinate values of the start points of the arcs 1, 2, 5 and 8, which have been stored in the arc data storage section, are updated to or brought up to the coordinate value of the computed node (Step S218).

Next, a data correcting circuit 234 corrects curvilinear equations of the arcs 1, 2, 5 and 8 based on the coordinate value of the computed node and data about the optimum curved surfaces selected for the surface loops 1, 2, 4 and 5 in Step S212 (Step S219). When the correction of the curvilinear equations is completed, the node deciding circuit 230 makes a decision as to whether or not processing have been effected on all the nodes (Step S220). If the answer is NO in Step S220, then the routine procedures subsequent to Step S218 are executed. If the answer is YES in Step S220, the execution of the routine procedures on the flowchart is completed.

On the other hand, when it is decided in Step S217 that the coordinate value of the computed node does not exist on each of the optimum curved surfaces, the node deciding circuit 230 outputs the result of decision to the node correcting circuit 232. The node correcting circuit 232 selects a node correcting method according to the number of the optimum curved surfaces related to the node, e.g., the node $N_2$, which has been selected in Step S211 and being corrected at present.

The node correcting method will be described below with reference to a flowchart shown in FIG. 29.

The node correcting circuit 232 decides whether or not the number of the optimum curved surfaces related to the node $N_2$ is one (Step S217-1). If the answer is YES in Step S217-1, then a line segment which passes through the computed node and is orthogonal to the one optimum curved surface, is created and a point on the optimum curved surface at which the vertical line segment intersects the optimum curved surface is regarded as a true node (Step S217-2). Then, data about the node is outputted to the data correcting circuit 234. The data correcting circuit 234 corrects arcs on and after Step S218 referred to above.

If the answer is NO in Step S217-1, it is then decided whether or not the number of the optimum curved surfaces is two (Step S217-3). If the answer is YES in Step S217-3, then line segments, which pass through the computed node and are perpendicular to the two optimum curved surfaces, are created (Step S217-4). Further, respective points on the optimum curved surfaces at which the vertical line segments intersect the optimum curved surfaces, are determined (Step S217-5). Thereafter, the midpoint of a line segment formed by connecting the so-created points to each other is determined (Step S217-6). It is then decided whether or not the midpoint exists on the optimum curved surfaces (Step S217-7).

If the answer is NO in Step S217-7, then the midpoint is regarded as the computed node (Step S217-8) and the routine procedures subsequent to Step S217-4 are executed again. Thus, the routine procedures in Steps S217-4 through S217-8 are repeatedly executed. If the answer is YES in Step S217-7, then the midpoint is regarded as a true node (Step S217-9). Thereafter, data about this node is outputted to the data correcting circuit 234, which in turn corrects arcs on and after Step S218 referred to above.

If the answer is NO in Step S217-3, then the node correcting circuit 232 decides that the number of the optimum curved surfaces is three or more (Step S217-10) and arbitrarily selects the three optimum curved surfaces from these optimum curved surfaces. Further, the node correcting circuit 232 generates line segments which pass through the computed node and are perpendicular to the three optimum curved surfaces (Step S217-11), and produces tangential planes wherein respective points on the optimum curved surfaces at which these vertical line segments intersect the three optimum curved surfaces are regarded as contact or tangent points (Step S217-12).

Next, a point at which the tangential planes are tangent to each other is determined (Step S217-13). It is further decided whether or not this tangent point exists on the three optimum curved surfaces (Step S217-14). If the answer is NO in Step S217-14, then the tangent point is regarded as the computed node (Step S217-15). Thereafter, the routine procedures subsequent to Step S217-11 are repeatedly executed until the tangent point exists on the three optimum curved surfaces.

If the answer is YES in Step S217-14, then the tangent point is regarded as a true node (Step S217-16). Thereafter, the data correcting circuit 234 corrects arcs on and after Step S218.

Thus, when it is decided in Step S217 that the coordinate value of the computed node does not exist on the optimum curved surfaces, the node correcting circuit 232 corrects the computed node based on the number of the optimum curved surfaces related to the corresponding node.

According to the present embodiment, as has been described above, the curved-surface shapes 1 through $N_4$ most suitable for the closed or surface loops 1 through $N_3$ can be easily selected even if the data about the arcs 1 through $N_1$, the nodes 1 through $N_2$ and the closed or surface loops 1 through $N_3$ and the data about the curved-surface shapes 1 through $N_4$ are not correlated with one another.

Further, even if the coordinate values of the endpoints of the individual arcs do not coincide with one another at the nodes 1 through $N_2$, the optimum node can be obtained. When the arcs 1 through $N_1$ are corrected based on the optimum node and the optimum curved-surface shapes 1 through $N_4$ selected for the surface loops 1 through $N_3$, the data about the surface model can be generated from the data about the rough wire frame model. The surface model data can be used as the basic data employed upon fabricating the press mold or the like.

Having now fully described the invention, it will be apparent to those skilled in the art that many changes and modifications can be made without departing from the spirit or scope of the invention as set forth herein.

What is claimed is:

1. A method of producing solid models, comprising the steps of:

preparing input data taken from a solid mock-up model by extracting feature lines existing on an external surface of said mock-up model as arcs, to prepare a rough wire frame model of said solid mock-up model;

reading said input data about said arcs of said rough wire frame model, the input data consisting of three-dimensional coordinates of terminal points and a formula of a curved line of each arc, wherein at least some of said terminal points are not connected to an adjacent line or another terminal point;

determining three-dimensional coordinates of a node and arcs connected thereto, based on the input coordinates of the terminal points, wherein said rough frame model in which terminal points thereof are not connected is corrected in order to yield a completed wire frame model having all end points thereof connected to an adjacent line or another terminal point;

specifying a set of arcs looping around a further-indivisible surface of said completed wire frame model, as an outermost line surrounding the entire completed wire frame model except for said indivisible surface;

dividing a region of said completed wire frame model, surrounded wholly by the outermost line, or partly by the outermost line and partly by division lines, or wholly by the division lines, into two new partial wire frame models, by a new division line starting from a node located on the outermost line or one of the division lines, or at one of junction points thereof, traversing said region without making a loop, passing along each of the arc or arcs included in said region only once, and reaching another node located on the outermost line or one of the division lines, or at another junction point thereof;

repeating the step of division until there remains no area which has not yet been passed through in any of the partial wire frame models;

defining a set of arcs looping around each of the partial wire frame models which are further indivisible, as a surface loop of said completed wire frame model, the partial wire frame models making up a surface model from said completed wire frame model; and supplying data defining said surface model as input data to a numerically controlled machine tool for fabricating a press mold conforming to said surface model.

2. The method according to claim 1, wherein said step of determining the nodes comprises:

making a pair of arbitrarily chosen two terminal points, the distance between which falls within a predetermined allowable length;

making a combination of two pairs which include one of the terminal points in common, and further adding each pair to the combination if the pair and combination include one of the terminal points in common;

determining, after completion of making the possible combinations, the coordinates of each node to be the center of gravity calculated from the coordinates of respective terminal points included in each of resulting combinations and pairs which remain outside the combinations; and correcting the coordinates of respective terminal points and the curved line formulas of respective arcs connected to each node, based on the determined coordinates of the node.

3. The method according to claim 2, further comprising the steps of:

reading solid shape data consisting of formulas of a plurality of curved surfaces determined based on a mock-up model from which said rough wire frame model is derived, and inputted with a same scale and posture as said rough wire frame model;

selecting, among the inputted plurality of curved surfaces, a set of curved surfaces each having, within a tolerable error, a curvature of an arbitrarily specified arc;

selecting, among the selected curved surfaces, a curved surface having, within the tolerable error, the curvature of respective arcs included in a surface loop having said specified arc, as the curved surface corresponding to the surface loop; and correcting the coordinates of respective nodes and the curved line formulas of respective arcs included in each surface loop, and the coordinates of respective terminal points ending at the respective nodes, based on the solid shape data of the curved surface corresponding to the surface loop.

4. The method according to claim 1, wherein the division lines, after a first division of said completed wire frame model, consist of a last division line having been formed in a latest division and old division lines having been formed in respective divisions made earlier than the latest division, and said step of division of said completed wire frame model comprises the steps of:

selecting a start node, from which a new division line can be drawn without having a line segment duplicated with the outermost line or any of the division lines, from the nodes located on the outermost line with a first priority, from the nodes located on said last division line with a second priority, and from the nodes located on one of said old division lines or at one of junction points between said last division line and said old division lines with a third priority;

judging the new division line starting from the start node selected under said first priority to be always eligible;

judging the new division line to be eligible in a case where the new division line starting from the start node selected under said second priority reaches one of the nodes located on said last division line, only if a judging line starting from one of the nodes on the new division line can reach one of the nodes located on said old division lines;

judging the new division line to be eligible in a case where the new division line starting from the start node selected under said third priority reaches one of the nodes located at said junction points, only if a judging line starting from one of the nodes located on the segment of said last division line partitioned by the start node and an ending node of the new division line can reach one of the nodes located on the outermost line or said old division lines surrounding a region other than said region; and separating a region of said completed wire frame model surrounded only by the division lines which have failed to be eligible in the above judging steps, from ordinary surface loops as an indefinite region.

5. The method according to claim 4, wherein said new division line is corrected to have a shortest route between the start node and the ending node.

6. An apparatus for producing solid materials, comprising:

memory means for storing input data taken from a solid mock-up model by extracting feature lines existing on an external surface of said mock-up model as arcs, to prepare a rough wire frame model of said solid mock-up model;

means for reading said input data from said memory means, said input data including data about said arcs of said rough wire frame model, said input data further comprising three-dimensional coordinates of terminal points and a formula of a curved line of each arc, wherein at least some of said terminal points are not connected to an adjacent line or another terminal point;

means for determining the three-dimensional coordinates of a node and arcs connected thereto, based on input coordinates of said terminal points, said means for determining further including means for calculating a connecting point for any of said terminal points defined by said rough wire frame model which are not connected in order to yield a completed wire frame model having all end points thereof connected to an adjacent line or another terminal point;

means for specifying a set of arcs looping around a further-indivisible surface of said completed wire frame model, as an outermost line entirely surrounding said completed wire frame model except for said indivisible surface;

means for consecutively dividing a region of said completed wire frame model, surrounded wholly by the outermost line, or partly by the outermost line and partly by division lines, or wholly by the division lines, into two new partial wire frame models, by a new division line starting from a node located on the outermost line or one of the division lines, or at one of junction points thereof, traversing said region without making a loop, passing along each of the arc or arcs included in said region only once, and reaching another node located on the outermost line or one of the division lines, or at another junction point thereof, and consecutively sub-dividing each of said partial wire frame models until there remains no area which has not yet been passed through in any of said partial wire frame models;

means for defining a set of arcs looping around each of said partial wire frame models which are further indivisible, as a surface loop of said completed wire frame model, said partial wire frame models making up a surface model from said completed wire frame model; and means for supplying data defining said surface model as input data to a numerically controlled machine tool for fabricating a press mold conforming to said surface model.

7. The apparatus for producing solid models of claim 6, wherein said means for determining the nodes comprises:

means for making a pair of arbitrarily chosen two terminal points, the distance between which falls within a predetermined allowable length;

means for making a combination of two pairs which include one of said terminal points in common, and further adding each pair to the combination if the pair and combination include one of said terminal points in common;

means for determining, after completion of making the possible combinations, the coordinates of each node to be the center of gravity calculated from the coordinates of respective terminal points included in each of resulting combinations and pairs which remain outside the combinations; and means for correcting the coordinates of respective terminal points and the curved line formulas of respective arcs connected to each node, based on the determined coordinates of the node.

8. The apparatus for producing solid models of claim 7, further comprising:

means for reading solid shape data consisting of formulas of a plurality of curved surfaces determined based on a mock-up model from which said rough wire frame model is derived, and inputted with a same scale and posture as said rough wire frame model;

selection means for (a) selecting, among the inputted plurality of curved surfaces, a set of curved surfaces each having, within a tolerable error, the curvature of an arbitrarily specified arc and (b) selecting, among the selected curved surfaces, a curved surface having, within the tolerable error, the curvature of respective arcs included in a surface loop having said specified arc, as the curved surface corresponding to the surface loop; and means for correcting the coordinates of respective nodes and the curved line formulas of respective arcs included in each surface loop, and the coordinates of respective terminal points ending at the respective nodes, based on the solid shape data of the curved surface corresponding to the surface loop.

9. The apparatus for producing solid models of claim 6, wherein the division lines, after a first division of said completed wire frame model, consist of a last division line having been formed in a latest division and old division lines having been formed in respective divisions made earlier than the latest division, said means for consecutively dividing comprising:

means for selecting a start node, from which a new division line can be drawn without having a line segment duplicated with the outermost line or any of the division lines, from the nodes located on the outermost line with a first priority, from the nodes located on said last division line with a second priority, and from the nodes located on one of said old division lines or at one of junction points between said last division line and said old division lines with a third priority;

judging means for (a) judging the new division line starting from the start node selected under said first priority to be always eligible, (b) judging the new division line to be eligible in a case where the new division line starting from the start node selected under said second priority reaches one of the nodes located on said last division line, only if a judging line starting from one of the nodes on the new division line can reach one of the nodes located on said old division lines and (c) judging the new division line to be eligible in a case where the new division line starting from the start node selected under said third priority reaches one of the nodes located at said junction points, only if a judging line starting from one of the nodes located on the segment of said last division line partitioned by the start node and an ending node of the new division line can reach one of the nodes located on the outermost line or said old division lines surrounding a region other than said region; and means for separating a region of said completed wire frame model surrounded only by the division lines which have failed to be judged eligible by said judging means, from ordinary surface loops as an indefinite region.

10. The apparatus for producing said solid models of claim 9, wherein the new division line is corrected to have a shortest route between the start node and the ending node.

* * * * *